United States Patent
Ohnishi et al.

(10) Patent No.: US 6,327,391 B1
(45) Date of Patent: *Dec. 4, 2001

(54) PROTECTING IMAGE QUALITY FROM OCCURRENCE OF UNCORRECTABLE ERRORS

(75) Inventors: Shinji Ohnishi, Yokohama; Makoto Shimokoriyama, Kawasaki; Tetsuya Shimizu, Yokohama; Mitsuo Niida, Kawasaki; Akiyoshi Hamanaka, Hachioji; Yukinori Yamamoto, Tokyo, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/677,908

(22) Filed: Jul. 10, 1996

Related U.S. Application Data

(63) Continuation of application No. 08/310,348, filed on Sep. 22, 1994, now abandoned.

(30) Foreign Application Priority Data

Sep. 28, 1993 (JP) .................................................. 5-241492
Sep. 28, 1993 (JP) .................................................. 5-241493
Sep. 28, 1993 (JP) .................................................. 5-241494
Sep. 28, 1993 (JP) .................................................. 5-241495
Sep. 28, 1993 (JP) .................................................. 5-241496
Dec. 22, 1993 (JP) .................................................. 5-324363

(51) Int. Cl.$^7$ ............................................................. G06K 9/46
(52) U.S. Cl. .......................................... 382/236; 382/239
(58) Field of Search ............................. 382/232, 235, 382/236, 240, 244, 248, 251, 252, 253, 233, 234, 238, 239, 243, 245, 246, 250, 274, 275, 278, 282, 283, 284, 307, 308, 309; 348/403, 409, 416, 699, 411, 415, 402, 401, 417; 375/246

(56) References Cited

U.S. PATENT DOCUMENTS

| | | | |
|---|---|---|---|
| 4,703,350 | * 10/1987 | Hinman | 348/402 |
| 4,723,161 | * 2/1988 | Koga | 348/402 |
| 4,792,851 | * 12/1988 | Mochizuki | 348/402 |
| 4,805,017 | * 2/1989 | Kaneko et al. | 348/402 |
| 4,816,906 | * 3/1989 | Kummerfeldt et al. | 348/402 |
| 5,717,705 | 2/1998 | Shikakura et al. | 371/30 |

FOREIGN PATENT DOCUMENTS

| | | | |
|---|---|---|---|
| 0521529 | 1/1993 | (EP) . | |
| 0471580A2 | 2/1992 | (EP) | H04N/5/92 |
| 0485230A3 | 5/1992 | (EP) | H04N/7/13 |
| 0521529A2 | 1/1993 | (EP) | H04N/7/13 |
| 0605209A2 | 7/1994 | (EP) | H04N/7/13 |
| 0414113A3 | 2/1991 | (EP) | H04N/7/137 |
| 0577417A2 | 1/1994 | (EP) | H04N/7/137 |

OTHER PUBLICATIONS

ICASSP–92, vol. 3, Mar. 23, 1992 San Francisco, Cal, USA, pp. 545–548, XP 000378989 P. Haskell et al. "Resynchronization of Motion Compensated Video Affected by ATM Cell Loss".

* cited by examiner

*Primary Examiner*—Jose L. Couso
*Assistant Examiner*—Duy M. Dang
(74) *Attorney, Agent, or Firm*—Fitzpatrick, Cella, Harper & Scinto

(57) ABSTRACT

An image reproducing apparatus reproduces an encoded image signal, detects a motion vector of a block including undecodable image signal by using the reproduced image signal, and structuring an image signal for the block including the undecodable signal by using the motion vector to reproduce a visually high quality image even when the block including the undecodable image signal moves.

32 Claims, 31 Drawing Sheets

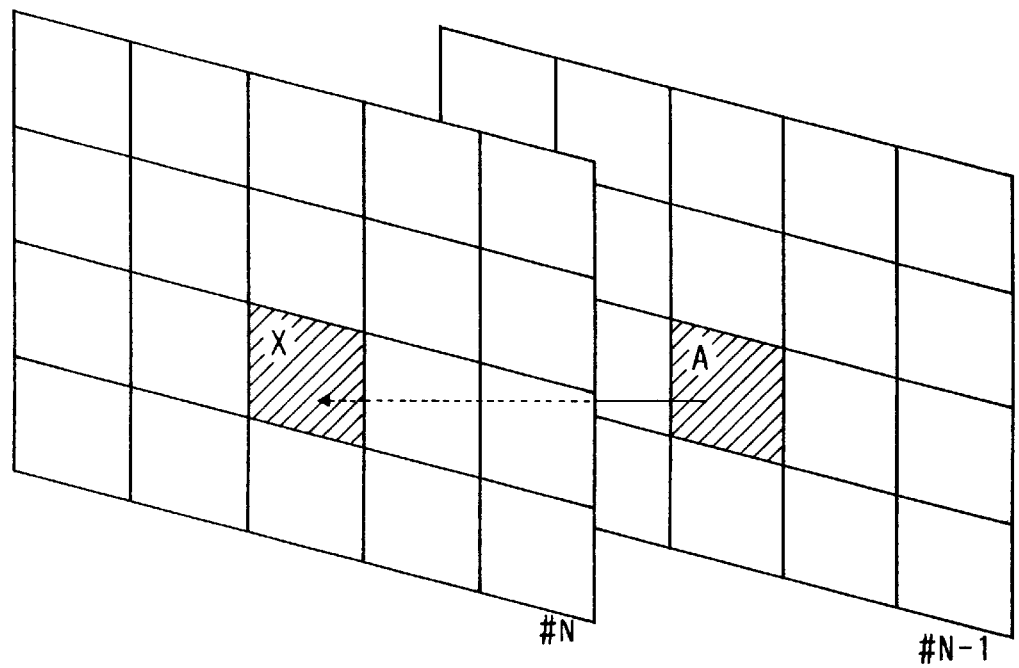

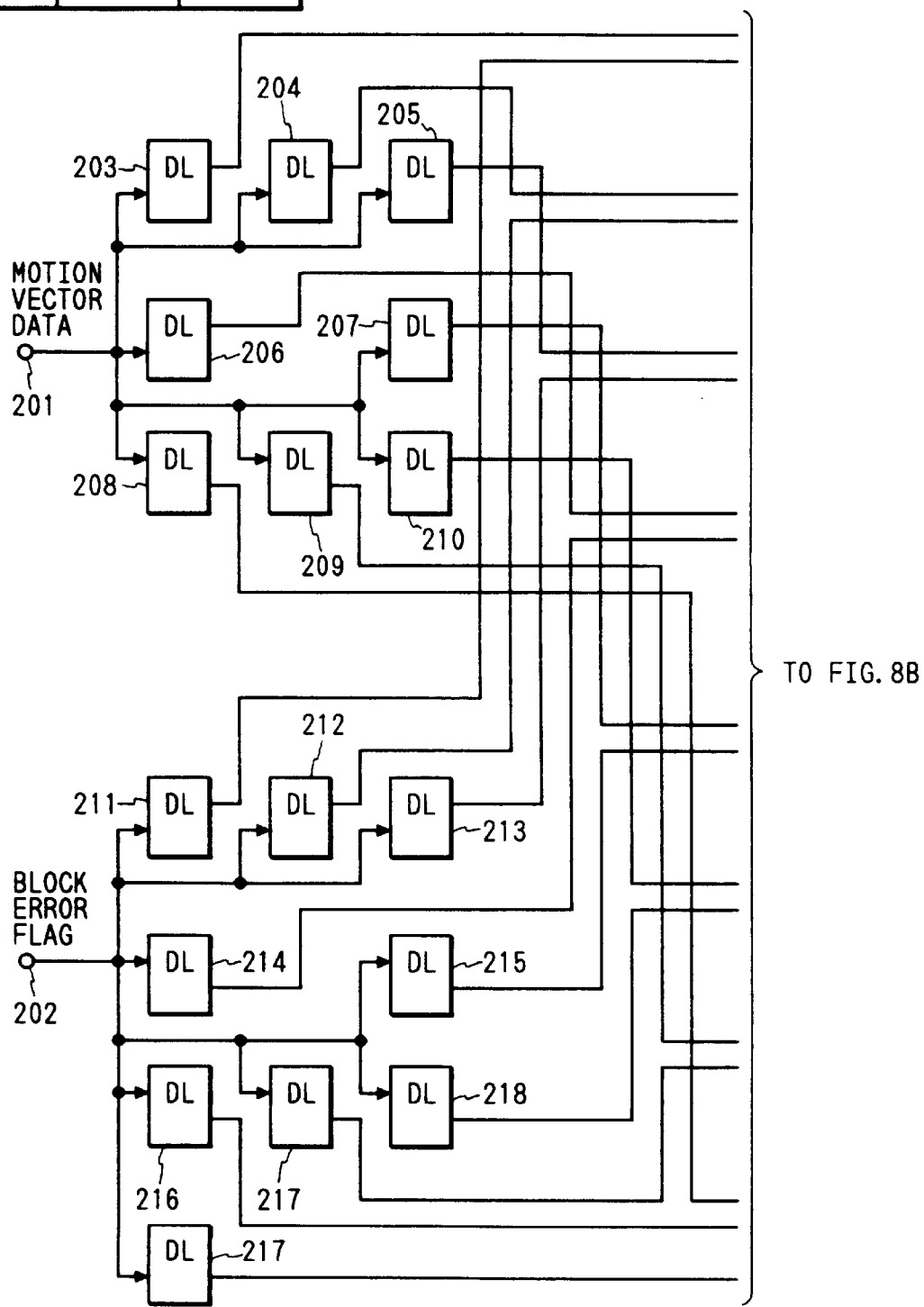

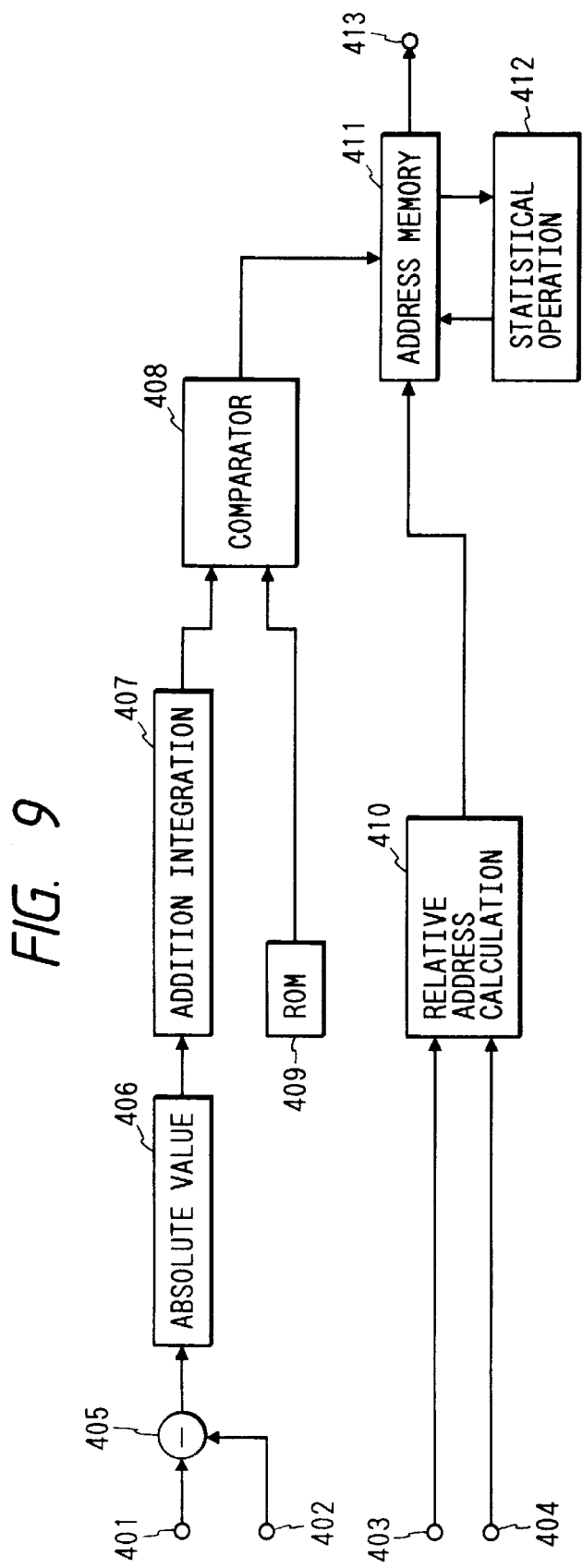

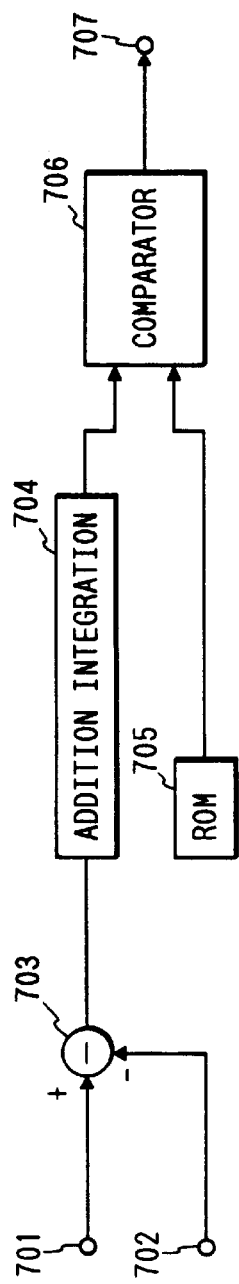
FIG. 23
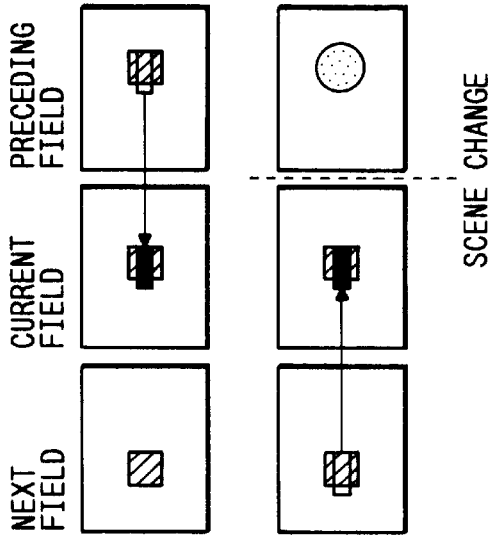
FIG. 24A
FIG. 24B

PROTECTING IMAGE QUALITY FROM OCCURRENCE OF UNCORRECTABLE ERRORS

This application is a continuation of application Ser. No. 08/310,348 filed Sep. 22, 1994, now abandoned.

BACKGROUND OF THE INVENTION

1. Field of the Invention

The present invention relates to an image signal reproducing apparatus for generating an image signal by decoding a compressed and encoded image signal.

2. Related Background Art

An orthogonal transformation encoding system has been known as a technique for compressing and encoding an image signal with a high efficiency. In this technique, an image signal is divided into blocks each having a predetermined number of pixels, and they are orthogonal-transformed by such as a discrete cosine transformation (DCT) and the transformed coefficients are quantized and entropy-encoded.

FIG. 1 shows a block diagram of major elements of a digital VTR as an example of an image recording and reproducing apparatus which uses such block encoding and decoding. The flow of the image signal in FIG. 1 will now be explained. Digitized image data is inputted from an input terminal and is groups into blocks of m pixels×n pixels by a block forming circuit 2.

The image data blocked by the m×n pixel unit (block forming circuit 2) is orthogonal-transformed by a DCT (discrete cosine transformation) circuit 3 so that it is transformed from space area data to frequency area data. The data transformed to the frequency area data is quantized by a quantization circuit 4, and variable-length-encoded by a variable length encoding circuit 5 to attain a desired data transfer rate. Parity data is added to the variable length encoded data by an error correction encoding circuit 6 to error-correction-encode the data, which is formatted to conform to a recording medium by a recording and reproducing apparatus 7 and recorded on a magnetic tape.

In reproduction of the data, the data reproduced from the magnetic tape by the recording and reproducing apparatus 7 is formatted to conform to the signal processing in a succeeding stage, error correction is performed by using the parity data added during the recording by an error correction circuit (ECC) 8, and the data is decoded by a variable length decoding circuit 9. The decoded data is dequantized by an INVERSE-quantization circuit 10 and inversely discrete-cosine-transformed by an inverse DCT circuit 11, and then is converted from frequency area data to space area data and written into a frame memory 12. The image data written in the frame memory 12 is read in synchronism with the raster scan of a monitor, and error-uncorrectable data (hereinafter referred to as or "undesired error data") is interpolated by an interpolation circuit 13 and is then outputted from an output terminal 14 for display on the monitor. As used herein and in the claims, an "undesired error" or "undesired error data" refers to those errors that arise unintentionally during a process such as transmission or reproduction due to noise, random effects or the like. These terms do not include decoding errors that arise from data being encoded using a lossy coding method.

In such an encoding system, since the encoding is done block by block, when an uncorrectable error occurs during the error correction in decoding the encoded data, a decode error occurs block by block. Further, since the variable length code is frequently used, the decoding error propagates over a plurality of blocks, which significantly deteriorates the image quality.

As means for interpolation-correcting the block including the error data (hereinafter referred to as an "error block"), an inter-frame interpolation system in which the error frame is replaced by an image of a preceding frame as shown in FIG. 2 has been known. In FIG. 2, when a block X of a frame #N is undecodable, the data of the block X is replaced and interpolated by decoded data of a block A at the same position on the field in the preceding frame #(N−1).

As an interpolation system which is effective when the error block is dynamic, an intra-field linear interpolation system which interpolates an error block by using pixels in the same field as shown in FIG. 3 has been known. In FIG. 3, upper case letters A, B and X denote encoded blocks and lower case letters a, b and x with suffixes 1, 2, . . . denote lines of reproduced image signals included in the respective encoded blocks A, B and X. The lines with an odd number suffix (shown by a chain line) are in an odd number field, and the lines with an even number line (shown by a broken line) are in an even number field. For the purpose of explanation, it is assumed that the encoded block comprises 8×8 pixels (m=n=8) in the frame.

It is assumed that the block X is an undecodable error block and block A and B which are located above and below the block X on the display screen are decodable. Lines x1–x8 of the error block X are replaced by the inter-field linear interpolated values by the bottom lines a7 and a8 of the respective fields of the upper block A and top lines b1 and b2 of the respective fields of the lower block B.

For example, in the odd number field, $$x1=(4a7+b1)/5$$

$$x3=(3a7+2b1)/5$$

$$x5=(2a7+3b1)/5$$

$$x7=(a7+4b1)/5$$

and in the even number field, $$x2=(4a8+b2)/5$$

$$x4=(3a8+2b2)/5$$

$$x6=(2a8+3b2)/5$$

$$x8=(a8+4b2)/5$$

Thus, in the prior art image signal reproducing apparatus, a state of movement of an error block, that is, a correlation between an image screen (frame) including the error block and the immediately following image, screen is determined, and the two interpolation methods are selectively used.

However, in the digital VTR described above, the movement information for the error block is binary, that is, "move" or "non-move". For the non-move, sharp interpolation may be made, but for the move, the outline of the image for inter-field linear interpolation processing cannot be reproduced, and non-sharp image appears so that visually high-grade image is not reproduced.

Further, in detecting the movement of the error block, the movement between frames is detected based on the data of the frame including the error block and the data which is one frame before. Thus, when the move is detected, even if a correlation between the data of the error block and the data of the image following to the frame including the error block is high and better image will be produced by the interpolation using the data of the following image, the inter-field interpolation is forcibly used, and high quality image may not be reproduced.

Further, when the inter-field-intra-field interpolation is selected, a resolution may be reserved by the inter-frame interpolation but a border image between the error block and the surrounding pixel blocks is discontinuous due to a poor precision of the determination of the movement of the error block, and the reproduced image is unnatural and visually high quality image is not reproduced.

SUMMARY OF THE INVENTION

It is an object of the present invention to solve the above problems.

It is another object of the present invention to provide an apparatus which generates a visually high quality image even if an undecodable block moves.

In order to achieve the above objects, the present invention provides an image reproducing apparatus comprising (a) reproducing means for reproducing an encoded image signal, (b) decoding means for decoding the image signal reproduced by said reproducing means, (c) motion vector detection means for detecting a motion vector of a block comprising a plurality of pixels including an image signal undecodable by said decoding means, by using the image signal reproduced by said reproducing means, and (d) structuring means for structuring an image signal for the image signal of the block including the undecodable image signal in accordance with the output of said motion vector detection means.

It is another object of the present invention to provide an apparatus which prevents the structuring of the data of the undecodable block by the non-correlated image to provide a high quality image.

In order to achieve the above object, the present invention provides an image reproducing apparatus comprising (a) reproducing means for reproducing an encoded image signal, (b) decoding means for decoding the image signal reproduced by said reproducing means, (c) motion vector detection means for detecting a motion vector of a block comprising a plurality of pixels including an image signal undecodable by said decoding means, (d) generation means for generating the motion vector of the block including the undecodable image signal by using the motion vector of the surrounding blocks of the block including the undecodable image signal, (e) structuring means for structuring an image signal for the image signal of the block including the undecodable image signal in accordance with the motion vector generated by said generation means, and (f) modifying means for modifying a portion of the surrounding blocks of the block including the undecodable image signal.

It is another object of the present invention to provide an apparatus which reproduces an image such that the discontinuity in the boundary of the undecodable block with the surrounding blocks is less prominent.

In order to achieve the above object, the present invention provides an image processing device comprising (a) input means for inputting an encoded image signal, (b) decoding means for decoding the image signal inputted by said input means, (c) correlation detection means for detecting a correlation between an image of a field including an image signal undecodable by said decoding means and an image of a different field from the field including the undecodable image signal, (d) compare means for comparing the correlations of the image of the field including the undecodable image signal and the images of the preceding field and the succeeding field to the field including the undecodable image signal, and (e) structuring means for structuring an image signal for the undecodable image signal in accordance with the output of said compare means.

Other objects and features of the present invention will be apparent from the following detailed description of the preferred embodiments taken in conjunction with the drawings.

BRIEF DESCRIPTION OF THE DRAWINGS

FIG. 2 illustrates inter-frame interpolation;

FIGS. 8A, 8B and 8C, combined as FIG. 8, show another configuration of the interpolation circuit in the embodiment of the present invention;

FIG. 9 shows a configuration of a motion vector detection circuit in the embodiment of the present invention;

FIG. 23 illustrates scene change;

FIGS. 24A and 24B show a configuration of a scene change circuit in the apparatus of FIG. 22;

DETAILED DESCRIPTION OF THE PREFERRED EMBODIMENTS

The embodiments of the present invention are now explained in conjunction with the drawings.

Figure 4:
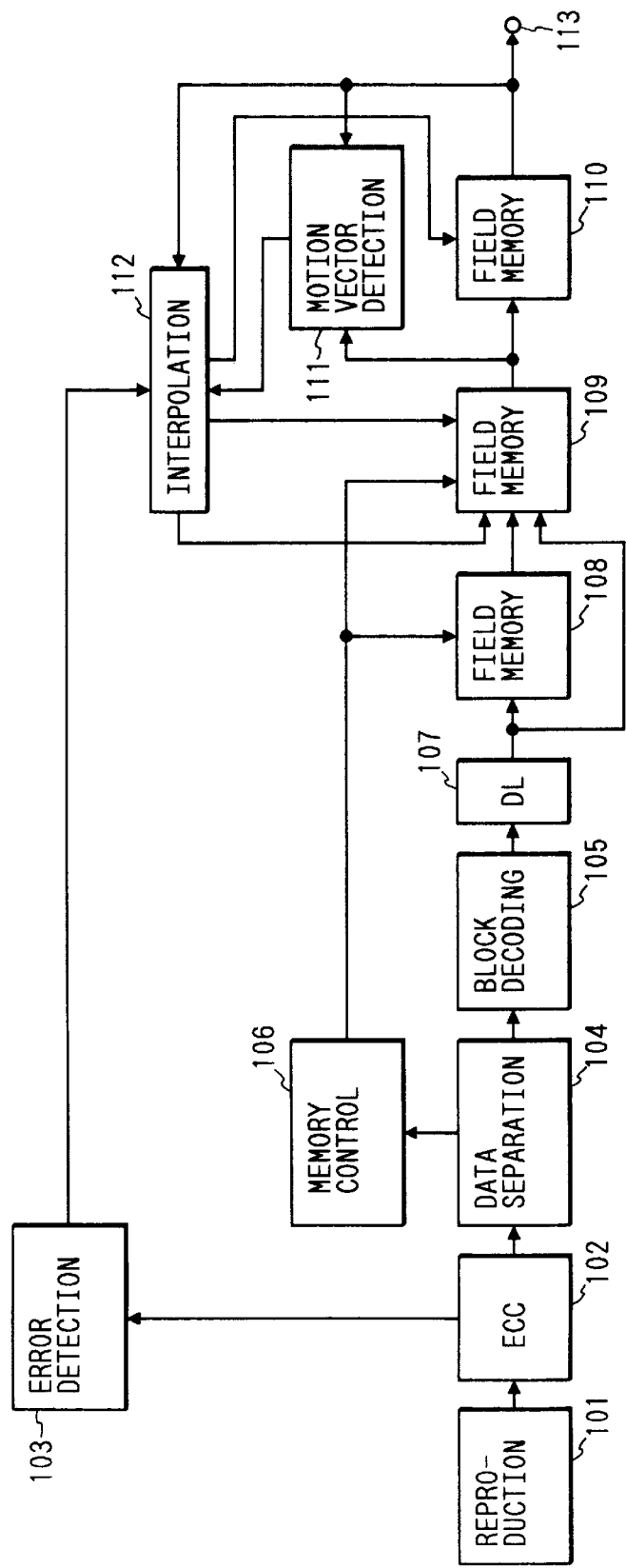
FIG. 4 shows a configuration of a digital VTR reproducing apparatus in accordance with an embodiment of the present invention.

FIG. 4 shows a block diagram of a configuration of a reproducing apparatus of a digital VTR as an embodiment of the present invention.

In FIG. 4, an image signal reproduced from a magnetic tape by a reproducing circuit 101 is sent to an ECC circuit 102. For the purpose of explanation, it is assumed that the reproduced signal is reproduced and decoded frame by frame.

In the ECC circuit 102, error codes in the reproduced signal are corrected and it is outputted to a data separation circuit 104. For uncorrectable code error, the ECC circuit 102 outputs an error flag indicating the uncorrectable error to an error detection circuit 103. The error detection circuit 103 generates a block error flag indicating whether each block is decodable or not based on the error flag from the ECC circuit 102.

The data separation circuit 104 receives the data from the ECC circuit 102, separates it to block address data indicating a position of the block on the image and image data, and outputs them to a memory control circuit 106 and a block decode circuit 105, respectively. The block decode circuit 105 applies the de-quantization process and the inverse DCT process to the reproduced image signal as described above to decode the image data of the original format image block by image block, and outputs image data of a first field to a field memory 109 and image data of a second field to a field memory 108 through a delay circuit 107 such as a buffer memory having a delay time corresponding to an interpolation process time to be described later. The memory control circuit 106 determines write addresses of the decoded image data of the pixel blocks to the field memories 107 and 108, respectively, based on the block address data from the data separation circuit 104.

The field memory 110 stores the image data which is one field before the image to be interpolated (the image in the field memory 109). A motion vector detection circuit 111 detects an inter-field motion vector of each block is detected for each image block based on the image data form the field memories 109 and 110 and outputs it to an interpolation circuit 112. The motion vector detection method will be described later.

The interpolation circuit 112 estimates the move of the error block by using the motion vector of the surrounding blocks of the error block detected by the motion vector detection circuit 111, and updates the data of the error block stored in the field memory 109 by the image data of the field memory 110 by using the estimated motion vector of the error block to interpolate it.

When the interpolation of the first field is completed, the data of the field memory 110 is outputted to an external device from an output terminal 113. The data of the field memory 109 is written into the field memory 110, and the data of the field memory 108 is written into the field memory 109. At this time point, the field memory 110 stores the image data of the first field, for which the interpolation has been completed, and the field memory 109 stores the data of the field for which the interpolation has not been effected. If there is undecodable data in the image data in the field memory 109, the same interpolation is conducted to the image data of the second field, and the data of the field memory 110 is outputted from the output terminal 113 and the data of the field memory 109 is written into the field memory 109. The image data of the next frame is written into the field memories 108 and 109 to sequentially conduct the interpolation.

Figure 5:
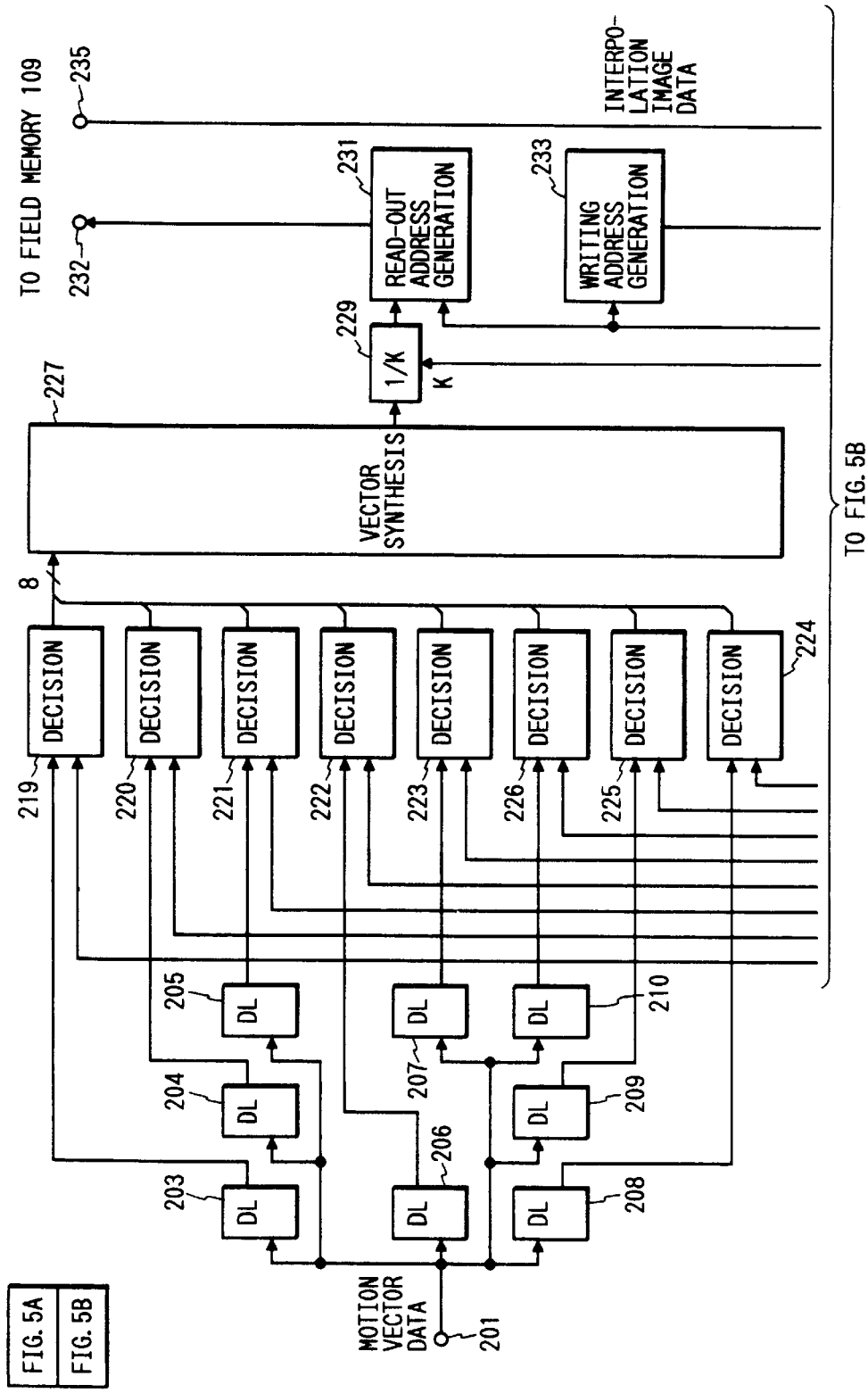
FIGS. 5A and 5B, combined as FIG. 5, show a configuration of an interpolation circuit in the embodiment of the present invention.
Figure 6:
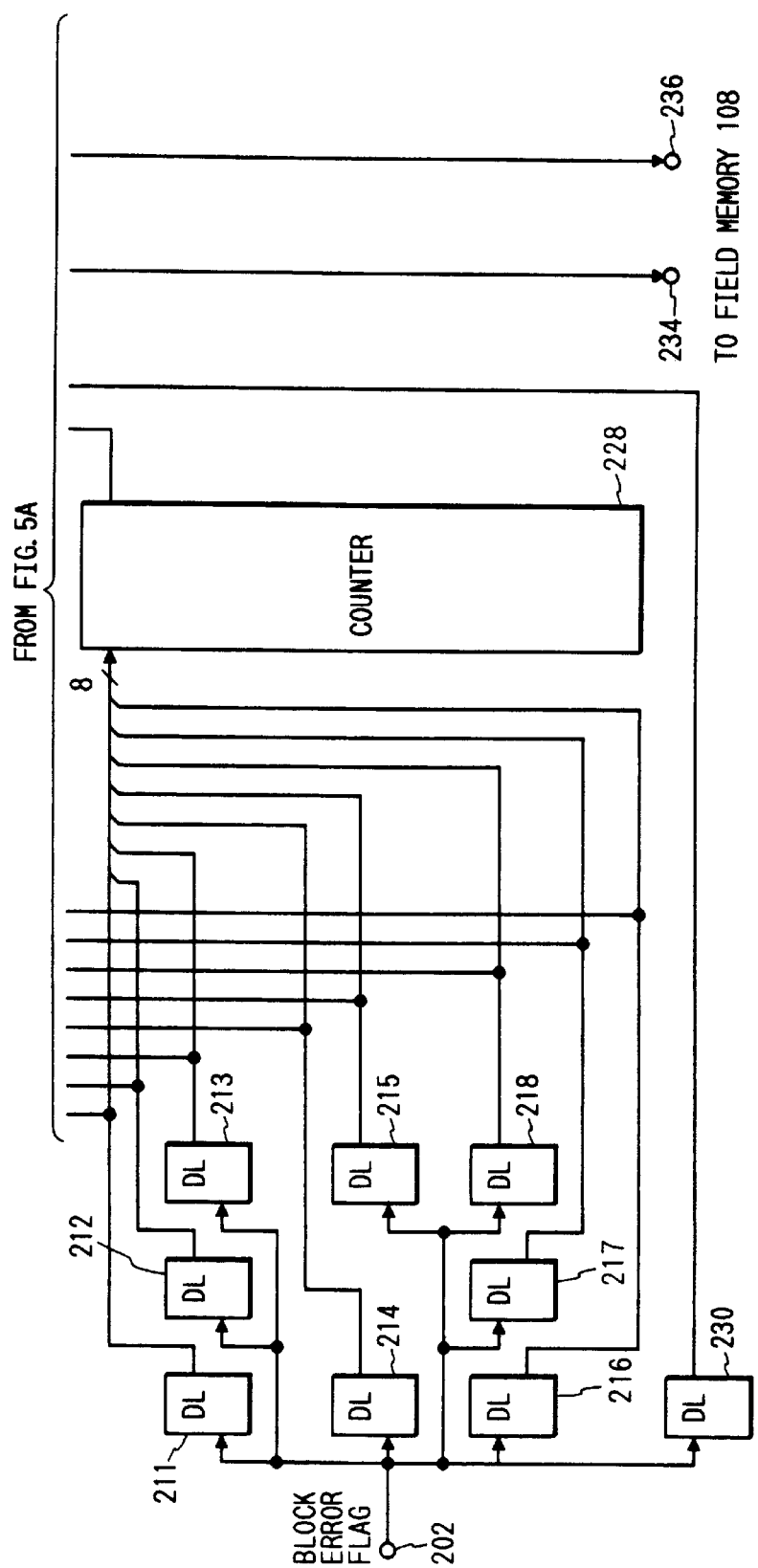
FIG. 6 shows an arrangement of blocks on a display screen.

Referring to FIGS. 5A to 7, the operation of the interpolation circuit 112 of FIG. 4 is explained. FIGS. 5A and 5B show a block diagram of a configuration of the interpolation circuit 112 of FIG. 4. FIG. 6 illustrates the operation of the interpolation circuit 112 of FIGS. 5A and 5B. In FIGS. 5A and 5B, each of squares A–H and X denotes one pixel block and the arrangement in FIGS. 5A and 5B show an arrangement of an image screen. In the present embodiment, it is assumed that the pixel block X is an error block and a motion vector of the block X is estimated to conduct the interpolation.

Numeral 201 denotes a motion vector data input terminal to which the motion vector data of each block is inputted image block by image block from a motion vector detection circuit 111 to be described later. Numeral 202 denotes a block error flag input terminal to which the block error flag is inputted image block by image block from the block error detection circuit 103. DL203–DL218 denote the delay circuits. Delay times of DL208 and DL216 are set to concurrently output the motion vector data and the block error flag to the image block F in FIG. 6, the delay times of DL203, DL204, DL205, DL206, DL207, DL209 and DL210 are set to output the motion vector data to the image blocks A, B, C, D, E, G and H, respectively, and the delay times of DL211, DL212, DL213, DL214, DL215, DL217 and DL218 are set to output the block error flags to the image blocks A, B, C, D, E, G and H, respectively.

The motion vector data and the block error flags for the pixel blocks A, B, C, D, E, F, G and H are inputted to discrimination (decision) circuits 219–226, respectively, and, if the corresponding pixel block is decodable, the motion vector data of the pixel block is outputted, while if it is undecodable, nothing is outputted. The motion vector data from the discrimination circuits 219–226 are inputted to a vector synthesization circuit 227 which sums horizontal components and vertical components of the vector data to sum the vectors. The block error flags to the image blocks A, B, C, D, E, F, G and H are inputted to a counter circuit 228 which counts the number of decodable image blocks. Numeral 229 denotes a multiplication circuit to which summed vector data from the vector synthesis circuit 227 is inputted and which divides it by the number K of decodable blocks counted by the counter circuit 228 to determine a mean value of the motion vector data around the error block. The output is outputted to a read address generation circuit 231 as the motion vector data of the block X. Namely, in the present embodiment, the motion vectors of only the decodable blocks of the blocks around the error block are used to determine the motion vector of the error block.

DL230 denotes a delay circuit having a delay time which is set to output the block error flag for the block X when the multiplication circuit 229 outputs the motion vector data for the block X. The motion vector data and the block error flag for the block X are inputted to the read address generation circuit 231. When the block error flag indicates undecodable state, the read address of the field memory 110 is determined from the motion vector data and it is outputted to the output terminal 232.

Figure 7:
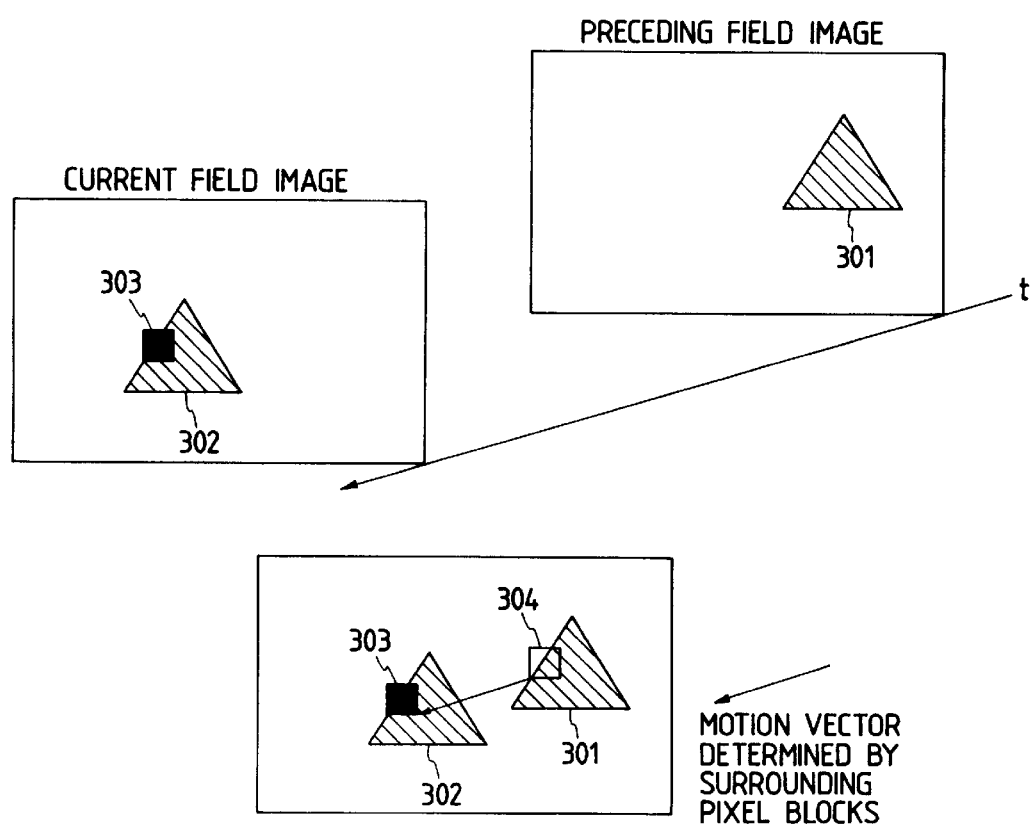
FIG. 7 illustrates an operation of the circuit of FIG. 5.

Referring to FIG. 7, the interpolation process in the present embodiment is explained. In FIG. 7, it is assumed that a triangle area 301 of the preceding field is the move area and that it is moved to an area 302 of the current field. Numeral 303 denotes a block X dropped in the current field image.

When the motion vector of the error block 303 is determined by using the motion vectors of the surrounding blocks, the read address generation circuit 231 generates the address of the area corresponding to the area 304 in FIG. 7 and outputs it to the output terminal 232. The field memory 110 receives the output and outputs the image data of the area 304 from that address to output the data to the input terminal 235. The error flag for the error block 303 is inputted to the writing address generation circuit 233, and when the flag indicates the undecodable state, it generates the write address corresponding to the error block 303 in the field memory 109 and outputs it to the output terminal 234. The image data output terminal 236 outputs the interpolation image data from the image data input terminal 235 and writes the image data to the address specified by the write address to conduct the interpolation.

In this manner, the interpolation is conducted by using the motion vector so that sharp interpolation is effected on the move block.

Figure 8B:
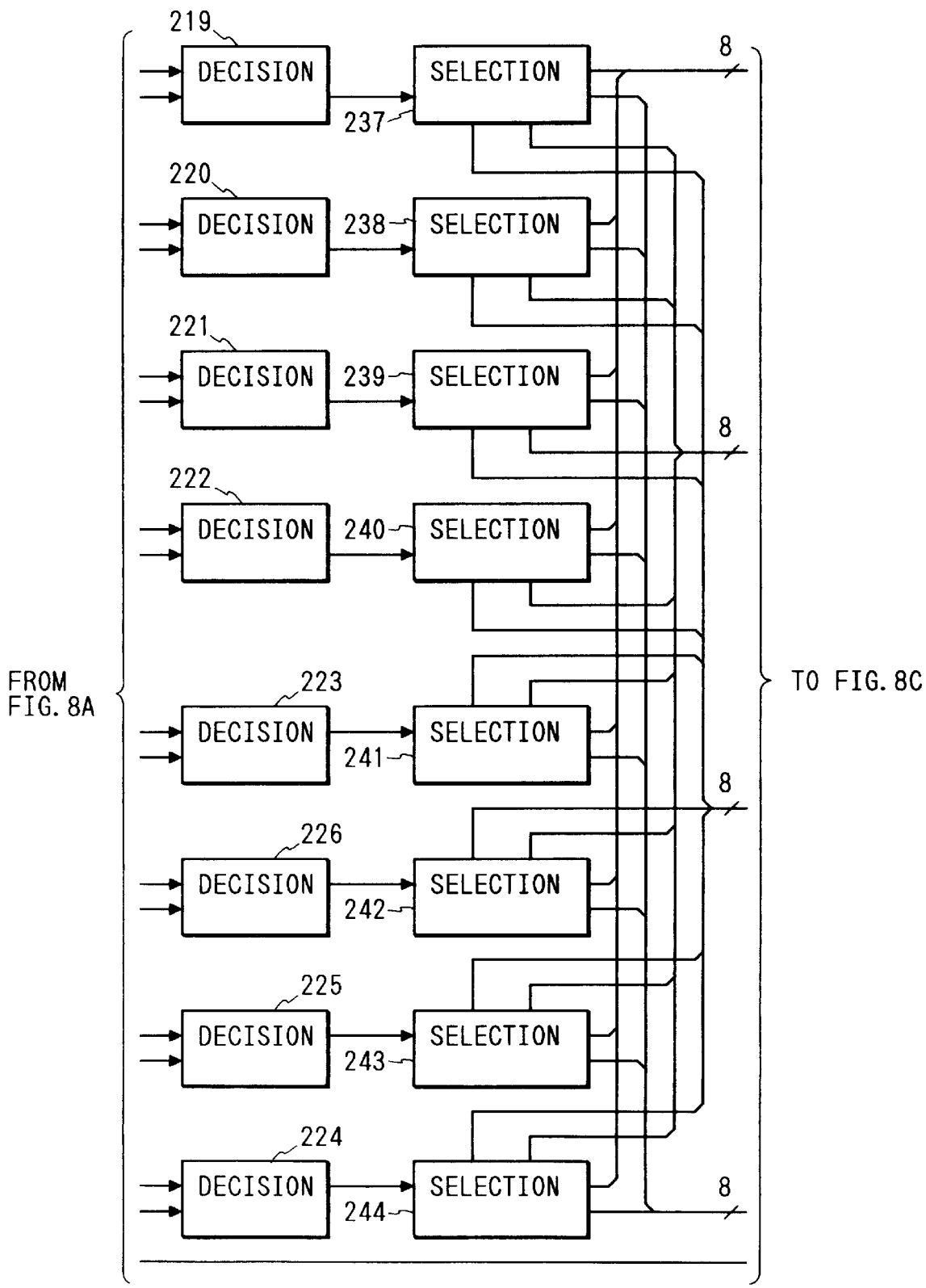
Figure 8C:
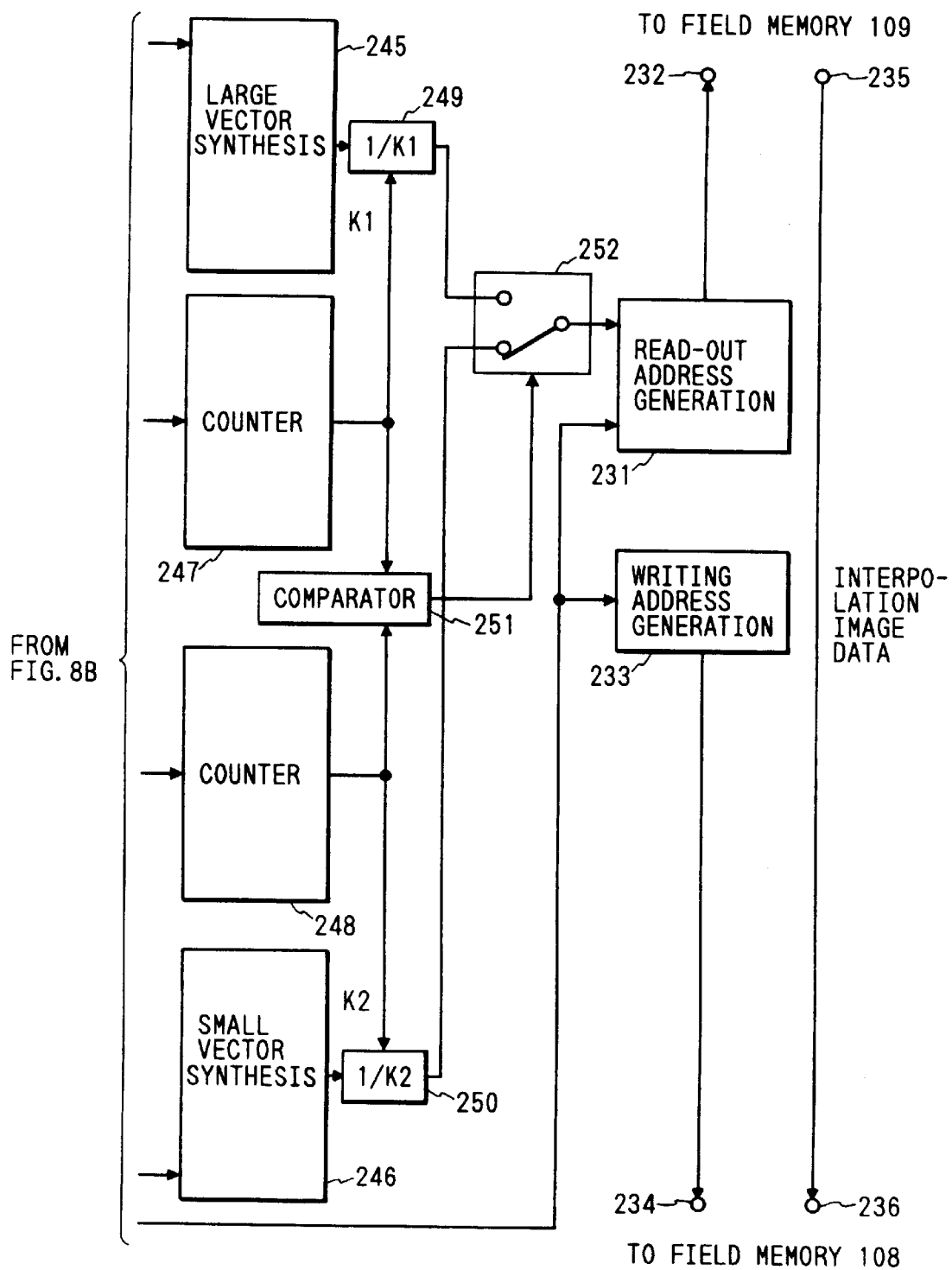

Referring to FIGS. 8A to 8C, another configuration of the interpolation circuit 112 of the present embodiment and the operation thereof are explained. FIGS. 8A to 8C show a block diagram of the other configuration of the interpolation circuit 112 of FIG. 4; the elements of the same or like functions as those of FIGS. 5A and 5B are designated by the same numerals, and so the explanation thereof is omitted.

In FIGS. 8A to 8C, numerals 237–244 denote selection circuits which, when the motion vector data is inputted from the discrimination circuits 219–224, determine the magnitudes of the motion vectors and compare them with a predetermined threshold to classify more active move data (hereinafter referred to as a "large vector") and less active move data (hereinafter referred to as a "small vector"), and select the data output destinations. When the input motion vector is classified as a large vector, the selection circuit outputs the motion vector data to a large vector synthesis circuit 245, and a flag indicating the large vector to a counter 247. When it is classified as the small vector, the selection circuit outputs the motion vector data to a small vector synthesis circuit 246 and a flag indicating the small vector to a counter 248. When the motion vector data is not inputted to the selection circuit, nothing is outputted.

Numeral 245 denotes the large vector synthesis circuit which sums the input large vectors by summing the horizontal components and the vertical components of the vectors inputted by the selection circuits 237–244. Numeral 246 denotes the small vector synthesis circuit which sums the small vectors by summing the horizontal components and the vertical components of the small vector data inputted by the selection circuits 237–244. Numerals 247 and 248 denote counter circuits. The counter circuit 247 counts the large vectors, and the counter circuit 248 counts the small vectors.

Numerals 249 and 250 denote multiplication circuits. The multiplication circuit 249 divides the summed motion vector data inputted from the large vector synthesis circuit 245 by the number K1 of the large vectors inputted from the counter circuit 247 to determine a mean vector of the large vectors. The multiplication circuit 250 divides the summed motion vector inputted from the small vector synthesis circuit 246 by the number K2 of the small vectors inputted from the counter circuit 248 to determine a mean vector of the small vectors.

Numeral 251 denotes a compare circuit which compares the magnitudes of the outputs K1 and K2 of the counter circuits 247 and 248. Numeral 252 denotes a selection switch to which the mean vectors of the large vectors and the small vectors are inputted from the multiplication circuits 249 and 250 and which is controlled by the output of the compare circuit 251. When K1>K2, the mean vector of the large vectors is selected, and when K1≦K2, the mean vector of the small vector is selected, and the selected mean vector is read as the motion vector data of the block X in FIG. 6 and outputted to the address generation circuit 231. The subsequent operation is similar to that of the previous embodiment.

In accordance with the present embodiment, when the motion vector of the error block is estimated, the motion vector data of the surrounding blocks to be used is adaptively selected in accordance with the magnitude to improve the precision in estimating the motion vector.

Referring to FIGS. 9 to 12B, the motion vector detection circuit 111 of the present embodiment is explained. FIG. 9 shows a block diagram of the motion vector detection circuit 111.

In FIG. 9, the image data read from the field memory 109 is inputted to an input terminal 401. The image data of a block (in a search window) for correlating to the image data inputted to the input terminal 401 is inputted from the field memory 110. A difference between the image data inputted to the input terminal 401 and the image data inputted to the input terminal 402 is calculated by a subtraction circuit 405 and the difference is outputted to an absolute value calculation circuit 406, which outputs an absolute value of the output of the subtraction circuit 405 to an addition integration circuit 407. The output of the absolute value calculation circuit 406 is referred to as an "absolute difference".

The addition integration circuit 407 accumulates the absolute differences corresponding to one predetermined block in the search window and outputs it to a compare circuit 408. The output of the addition integration circuit 407 represents a correlation in one field of a predetermined pixel block in the search window. The compare circuit 408 compares a predetermined reference stored in a ROM 409 and the correlation outputted by the addition integration circuit 407, and if the correlation is larger than the reference, it determines the correlation and outputs a write grant signal, and if the correlation is smaller than the reference, it determines the non-correlation and outputs a write inhibit signal to an address memory 411.

On the other hand, the addresses of the field memories of the pixel data inputted to the input terminals 401 and 402 through the input terminals 403 and 404 are inputted to a relative address calculation circuit 410, which selects the addresses of the pixels at the corresponding locations for each image block, of the input addresses and calculates a relative address of the pixel of one field earlier inputted from the input terminal 402 for the surrounding block of the error block inputted from the input terminal 401, as the motion vector for each block, based on the difference between the two addresses. The relative address may be calculated by horizontally and vertically dividing the field. When the compare circuit 408 outputs write grant signal to the address memory 411, the relative address is stored in the address memory 411, and when the compare circuit 408 outputs the write inhibit signal to the address memory 411, the relative address is not stored in the address memory 411, namely, the relative address for the block which likely has a correlation with the pixel block for which the motion vector is to be detected is stored in the address memory 411. Thus, the address memory 411 stores the relative address each time the compare circuit 408 outputs the write grant signal and a plurality of relative addresses are usually stored for the block to be detected.

A statistics calculation circuit 412 determines a frequency of occurrence of the relative addresses stored in the address memory 411 and outputs the relative address of the high frequency of occurrence to the address memory 411 as the finally detected motion vector.

Figure 10:
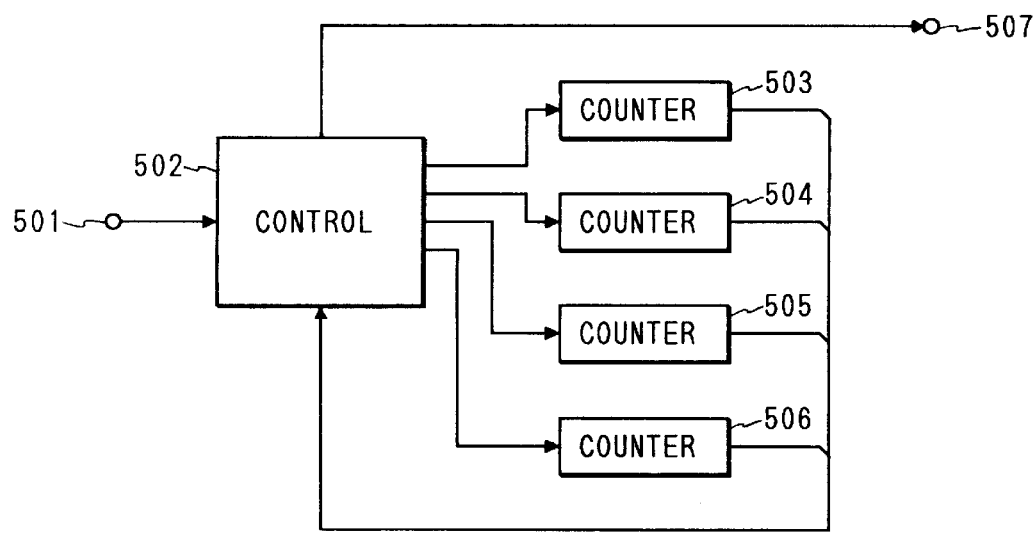
FIG. 10 shows a configuration of a statistics calculation circuit in the circuit of FIG. 9.

FIG. 10 shows a block diagram of an example of the statistics calculation circuit 412 of FIG. 9. Numeral 501 denotes an input terminal, numeral 502 denotes a control circuit for controlling the operation of counters, numerals 503–506 denote counters for counting output signals of a CPU, and numeral 507 denotes an output terminal. The input terminal 501 is connected to the address memory 411 of FIG. 9 and the relative addresses stored in the address memory 411 are inputted thereto. The control circuit 502 classifies the relative addresses and counts up the counters 503–506 for each class. The control circuit 502 performs this operation for all relative addresses to calculate the frequency of occurrence of the relative addresses. Thereafter, the control circuit 502 outputs the relative address of the highest frequency of occurrence of those frequencies of occurrence to the address memory 411 from the output terminal 507.

Figure 11:
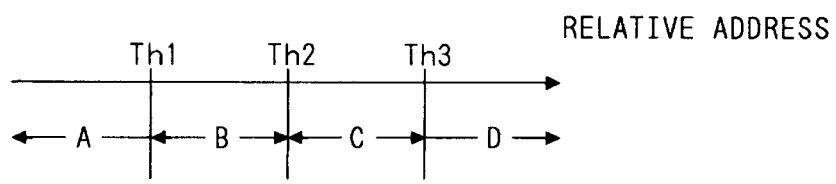
FIG. 11 illustrates an operation of the circuit of FIG. 9.

FIG. 11 illustrates the operation of the statistics calculation circuit 412 shown in FIG. 9. A horizontal line represents the relative address, A–D represent the ranges of the relative addresses, and thresholds Th1–Th3 represent boundaries of the ranges of the relative addresses. The thresholds Th1, Th2 and Th3 increase in this order. The ranges A–D correspond to the counters 503–506 of FIG. 10, respectively, and when the relative address of the range A is inputted to the control circuit 502, the counter 503 is counted up, when the relative address of the range B is inputted to the control circuit 502, the counter 504 is counted up, when the relative address of the range C is inputted to the control circuit 502, the counter 505 is counted up, and when the relative address of the range D is inputted to the control circuit 502, the counter 506 is counted up. Since the counter of the predetermined range is counted up, the frequencies of occurrence of the corresponding relative addresses in the ranges A–D can be detected. The range to detect the frequency of occurrence may be more finely determined by increasing the number of counters of FIG. 10. In FIG. 10, the counters are arranged externally of the control circuit 502, although the counters may be arranged in the control circuit by providing registers in the control circuit 502 and using those registers.

Figure 12A:
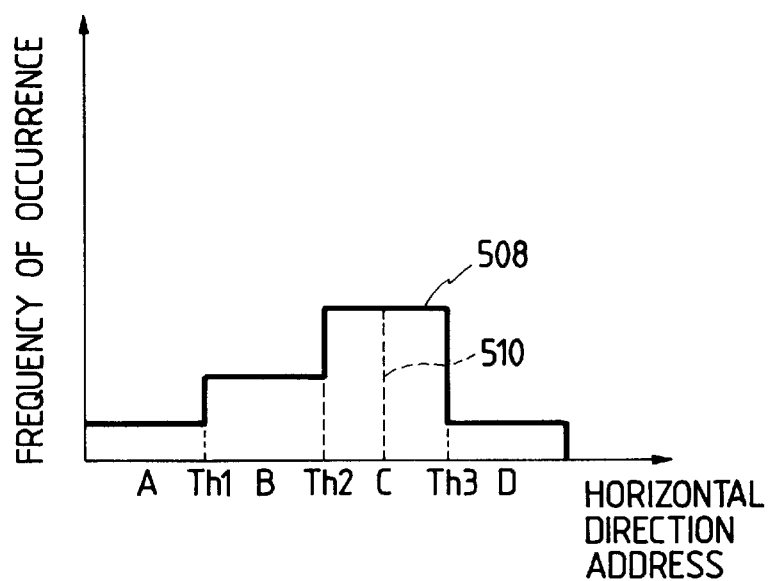
FIGS. 12A and 12B show results of operation by the circuit of FIG. 9.
Figure 12B:
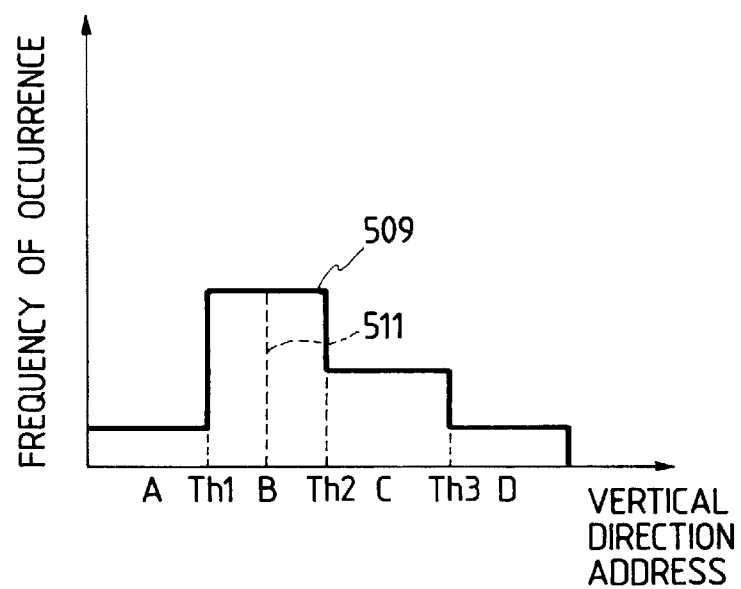

FIGS. 12A and 12B show examples of frequencies of occurrence of the relative addresses detected by the statistics calculation circuit 412. Since the address memory 411 stores the relative vectors in the horizontal direction and the vertical direction as described above, the frequencies of occurrence are also determined in the horizontal direction and the vertical direction. FIG. 12A shows the frequency of occurrence in the horizontal direction, and FIG. 12B shows the frequency of occurrence in the vertical direction. In FIG. 12A, an abscissa represents the horizontal address and an ordinate represents the frequency of occurrence. In FIG. 12B, an abscissa represents the vertical address and an ordinate represents the frequency of occurrence. Numerals 508 and 509 denote the frequencies of occurrence in the horizontal direction and the vertical direction, respectively.

As shown in FIGS. 12A and 12B, when a distribution of the frequency of occurrence as shown by 508 is derived, the motion vector detection circuit 111 selects a center address of the range C shown by a broken line 510 from the range C having the highest frequency of occurrence as the horizontal motion vector, and when a distribution of the frequency of occurrence as shown by 509 is derived, it selects a center address of the range B shown by a broken line 511 from the range B having the highest frequency of occurrence.

In this manner, when the motion vector detection circuit 111 of the present embodiment detects the motion vector for each block, it does so based on the frequency of occurrence of the relative addresses (motion vectors) in the search window of each block to be detected so that the motion vectors are precisely detected.

Figure 13:
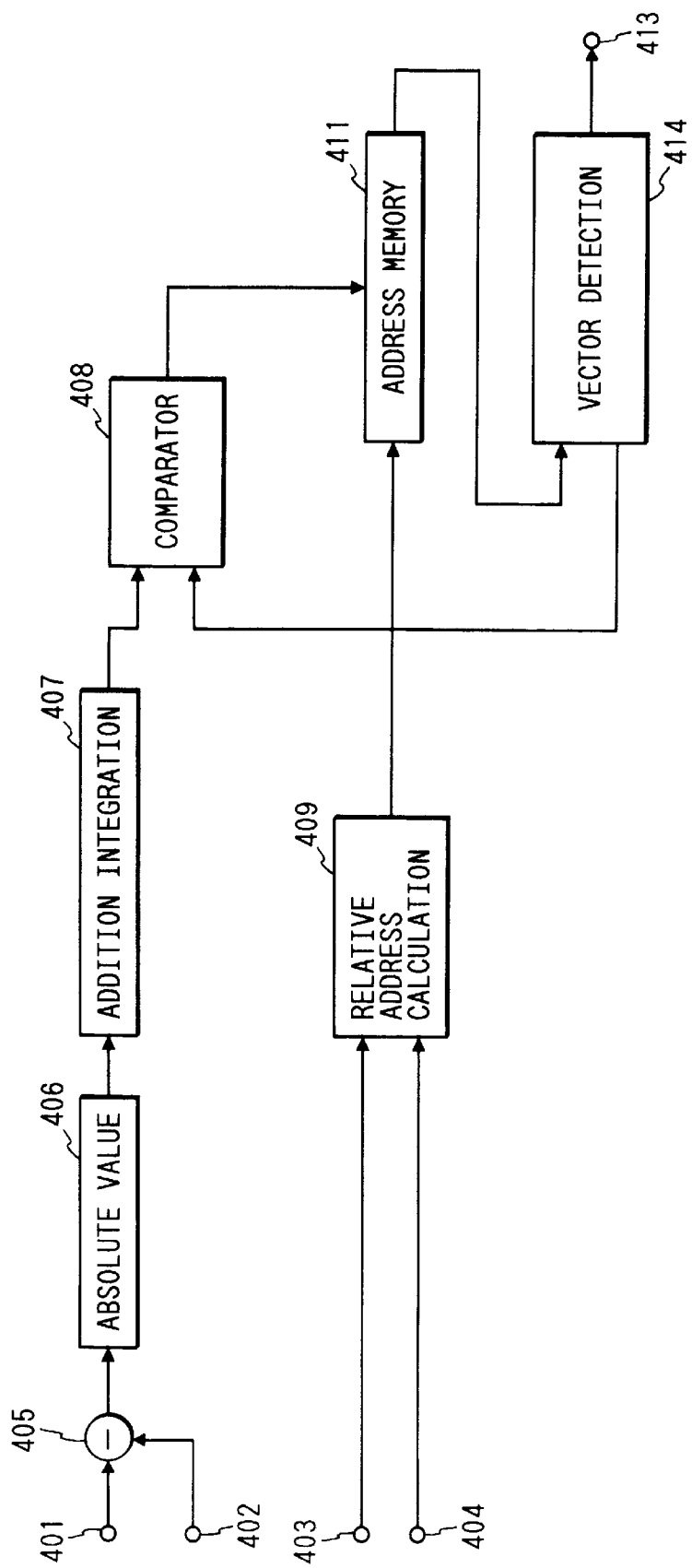
FIG. 13 shows another configuration of the motion vector detection circuit.

Other example of the motion vector detection circuit 111 is explained. FIG. 13 shows a block diagram of another configuration of the motion vector detection circuit 111 of FIG. 4. In FIG. 13, the elements having functions similar to those of the circuit of FIG. 9 are designated by the same numerals. In FIG. 13, numeral 414 denotes a vector detection circuit for performing a statistics process of the relative addresses stored in the address memory 411 and outputting the relative address having the highest frequency of occurrence as the motion vector. The vector detection circuit 414 changes the reference in the compare circuit 408 in accordance with the number of relative vectors stored in the address memory 411 so that the relative address used for the interpolation of the frequency of occurrence to be described later is properly stored in the address memory 411. Namely, when the number of relative addresses of the block to be detected stored in the address memory 411 is smaller than the predetermined number, the vector detection circuit 411 lowers the threshold outputted to the compare circuit 408 so that the proper number of relative addresses are always stored in the address memory 411. In this manner, the motion vector can be detected even when the number of relative addresses stored in the address memory 411 reduces.

Figure 14:
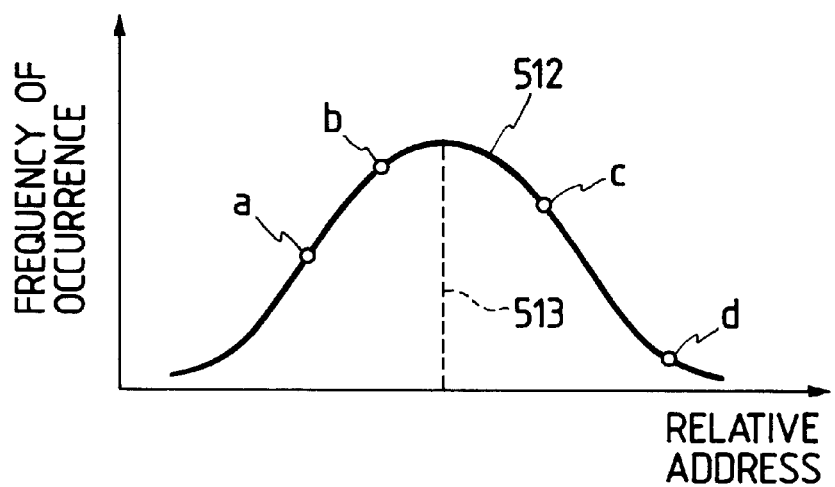
FIG. 14 illustrates an operation of the circuit of FIG. 13.

Referring to FIG. 14, the operation of the vector detection circuit 414 is explained. The vector detection circuit 414 first reads the relative addresses stored in the address memory 411 and calculates the statistics.

FIG. 14 shows a distribution of frequencies of occurrence of the relative addresses calculated by the vector detection circuit 414. In FIG. 14, an abscissa represents the horizontal relative address and an ordinate represents the frequency of occurrence, a to d represent measurement points for the frequencies of occurrence by the statistics process of the vector detection circuit 414, and a curve 512 represents a distribution of frequencies of occurrence derived by the interpolation based on those measurement points. In the present embodiment, for the purpose of simplicity, the frequencies of occurrence are detected for four relative addresses for the block to be detected.

The vector detection circuit 414 accumulates the number of relative addresses stored in the address memory 411 to calculate the frequencies of occurrences of the relative addresses for a to d. The vector detection circuit 414 determines the distribution of the frequencies of occurrence 512 by using the interpolation technique such as a spline interpolation, a minimum square interpolation or a Laglange interpolation based on the frequencies of occurrence of the relative addresses and outputs the relative address 513 having the highest distribution of frequencies of occurrence 512 as the motion vector.

Figure 15:
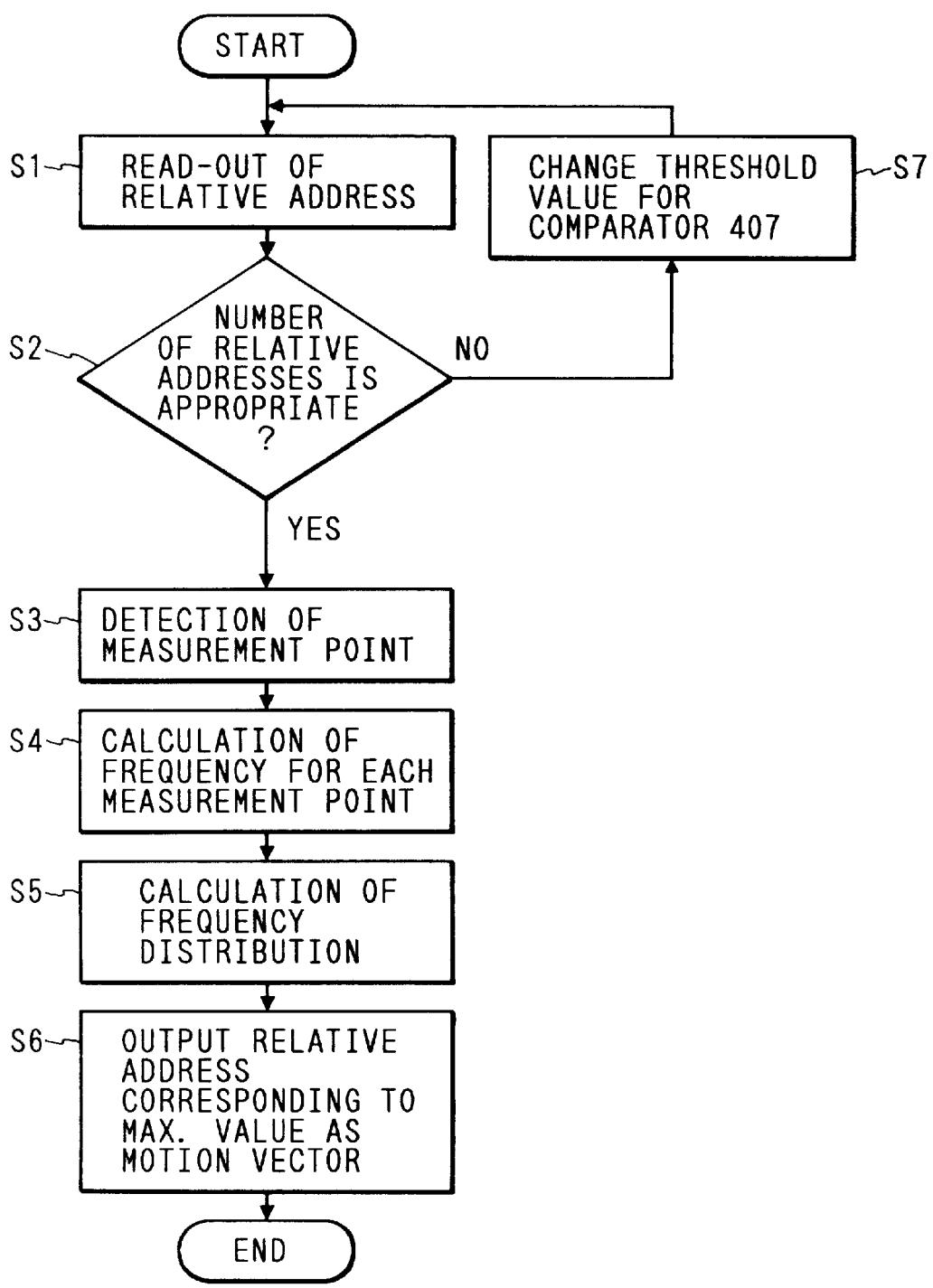
FIG. 15 shows a flow chart for illustrating an operation of the vector detection circuit of FIG. 13.

A series of operations of the vector detection circuit 413 is shown in a flow chart of FIG. 15.

In this manner, the motion vector of each block can be precisely detected.

Other configuration to detect the motion vector is explained.

In the present embodiment, when the motion vector of each block is detected, images of three consecutive fields are used.

Figure 16:
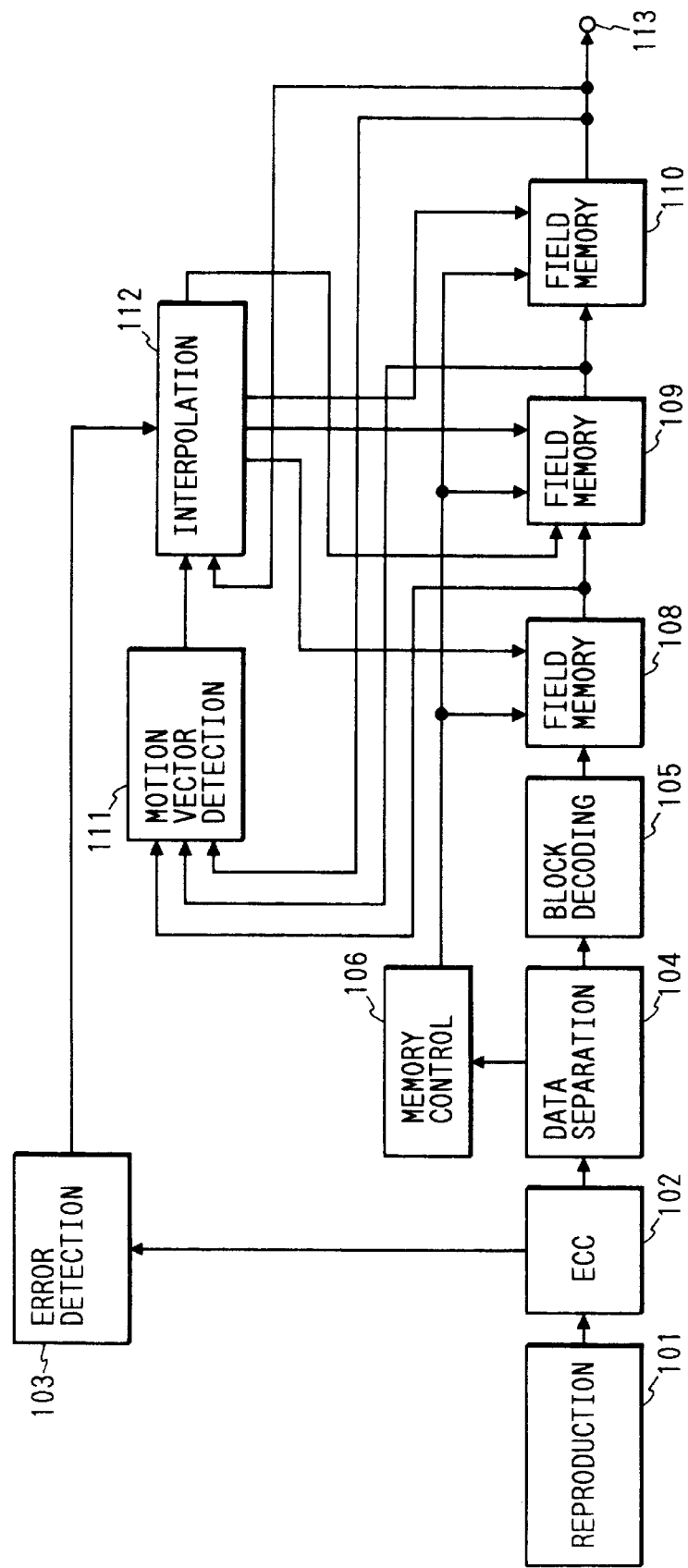
FIG. 16 shows a configuration of a digital VTR which uses other motion vector detection method.

FIG. 16 shows a block diagram of other configuration of the digital VTR reproducing apparatus in an embodiment of the present invention. The same elements to those of FIG. 4 are designated by the same numerals.

In the present embodiment, the image data decoded by the block decode circuit 105 is outputted field by field and stored in the field memory 108. The image data are inputted to the motion vector detection circuit 111 from the field memories 108, 109 and 110 and the motion vector detection circuit 111 detects the motion vector based on the image data of the three consecutive fields.

Figure 18:
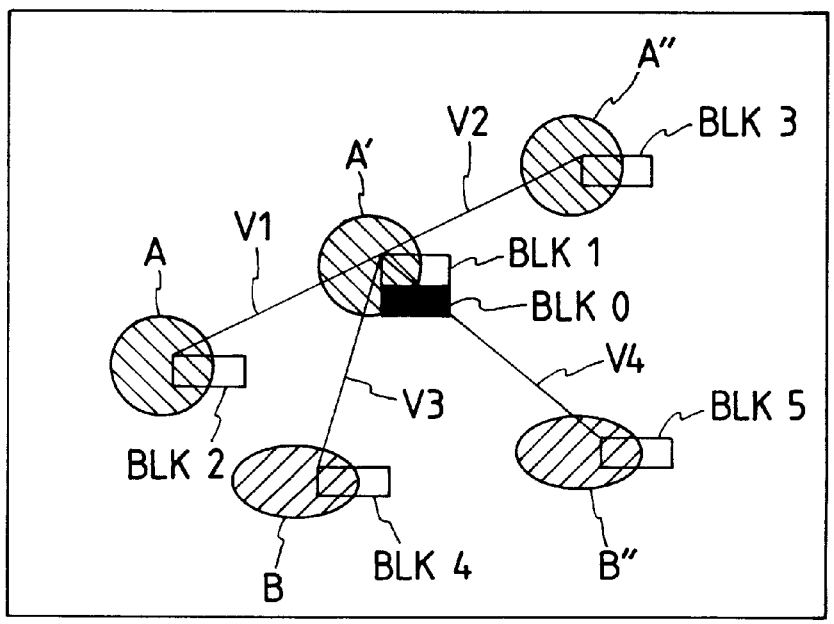
FIG. 18 illustrates an operation of the circuit of FIG. 17.
Figure 17:
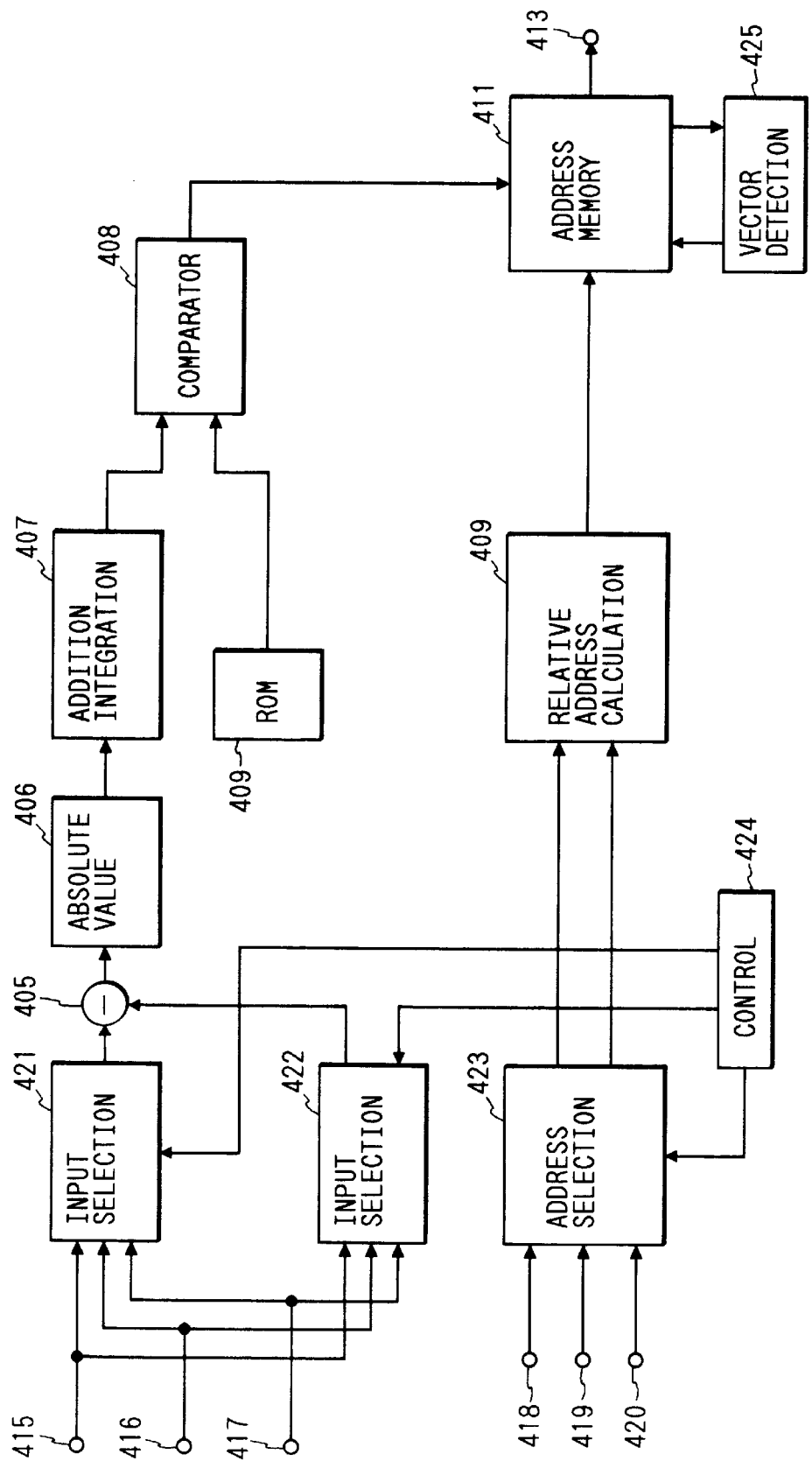
FIG. 17 shows other configuration of the motion vector detection circuit in the embodiment of the present invention.

Referring to FIGS. 17 and 18, the motion vector detection circuit 111 of FIG. 16 is explained. FIG. 17 shows a block diagram of a configuration of the motion vector detection circuit 111 of the present embodiment. In FIG. 17, the elements having the same functions as those of the previous embodiments are designated by the same numerals.

In FIG. 17, image data of one field earlier with respect to the image including the error block is inputted to the input terminal 415 from the field memory 108. Similarly, the image data from the field memory 109 is inputted to the input terminal 416 and the image data of one field earlier with respect to the image including the error block is inputted to input terminal 417 from the field memory 110.

The input selection circuits 421 and 422 are controlled by the control circuit 424, and select the image data from the image data inputted from the input terminals 415–417 one at a time and output them to the subtraction circuit 405. The input of the image data to the input terminals 415–417 is controlled by a control unit, not shown so that the input from the same input terminal is not applied to the input selection circuits 204 and 205.

The addresses of the field memories 108–110 of the image data inputted to the input terminals 415–417 are inputted to the input terminals 418–420 and they are outputted to the address selection circuit 423. The address selection circuit 423 is also controlled by the control circuit 424 and the addresses corresponding to the image data selected by the input selection circuits 421 and 422 are outputted to the relative address calculation circuit 409. The relative address calculation circuit 409 calculates the relative address based on the two input addresses in the same manner as that of the previous embodiment and outputs it to the address memory 411.

By calculating the relative address by using the image data of the three consecutive fields, the motion vectors of different timings are calculated for each block. Namely, when the input selection circuits 421 and 422 select the image data from the image input terminals 415 and 416, the relative address between the image of the field including the error block and the image of the field one field later than the field including the error block is derived, and when the image data from the image input terminals 416 and 417 are selected, the relative address between the image of the field including the error block and the image of the field one field earlier than the field including the error block is derived.

A sum of the difference absolute value of the outputs of the input selection circuits 421 and 422 is calculated for each block by the subtract circuit 405, the absolute value calculation circuit 406 and the addition integration circuit 407 and it is outputted to the compare circuit 408. The compare circuit 408 compares the predetermined reference stored in the ROM 409 and the accumulated value outputted by the addition integration circuit 407 to control the writing of the relative address to the address memory 411.

Accordingly, in the present embodiment, the relative addresses of the image having a large correlation to the image surrounding the error block are stored in the address memory 411 as the motion vectors of different timings. The vector detection circuit 425 detects the motion vector of each block based on the relative addresses stored in the address memory 411.

FIG. 18 illustrates the operation of the vector detection circuit 425 and shows images of different timings in the same plane.

In FIG. 18, A represents a moving object at a time t1, and it is moved to a position A' at a time t2 where t1<t2, and it is moved to a position A" at a time t3 where t2<t3. B represents a moving object similar to A and it is moved to a position B" at the time t3. V1, V2, V3 and V4 denote motion vectors by the relative addresses stored in the address memory 411. Accordingly, V1 and V3 are the motion vectors derived from the image data in the field memory 108 and the image data in the field memory 109, and V2 and V4 are the motion vectors derived from the image data in the field memory 109 and the image data in the field memory 110.

BLK0 represents an error block at the time t2 and BLK1 represents a block upwardly adjacent to the block BLK0 on the screen. The motion vector of BLK1 is used to estimate the motion vector of BLK0, BLK2, BLK3, BLK4 and BLK5 denote detection blocks for which the motion vectors have been detected for BLK1. The motion vectors V1 and V3 are detected during the times t1–t2, and the motion vectors V2 and V4 are detected during the time t2–t3. The vector detection circuit 425 compares the directions of those motion vectors for different times.

In the present embodiment, the directions of the motion vectors are compared for the combinations of V1 and V2, V1 and V4, V3 and V2, and V3 and V4. The comparison of the directions of the motion vectors may be effected by using a ratio of a vertical component and a horizontal component of the motion vector. The vector detection circuit 425 compares the horizontal to vertical ratios of the motion vectors to select a combination of closest ratios. In FIG. 18, the combination of V1 and V2 is selected because the directions significantly differ in the combinations of V1 and V4, V3 and V2, and V3 and V4.

Figure 19:
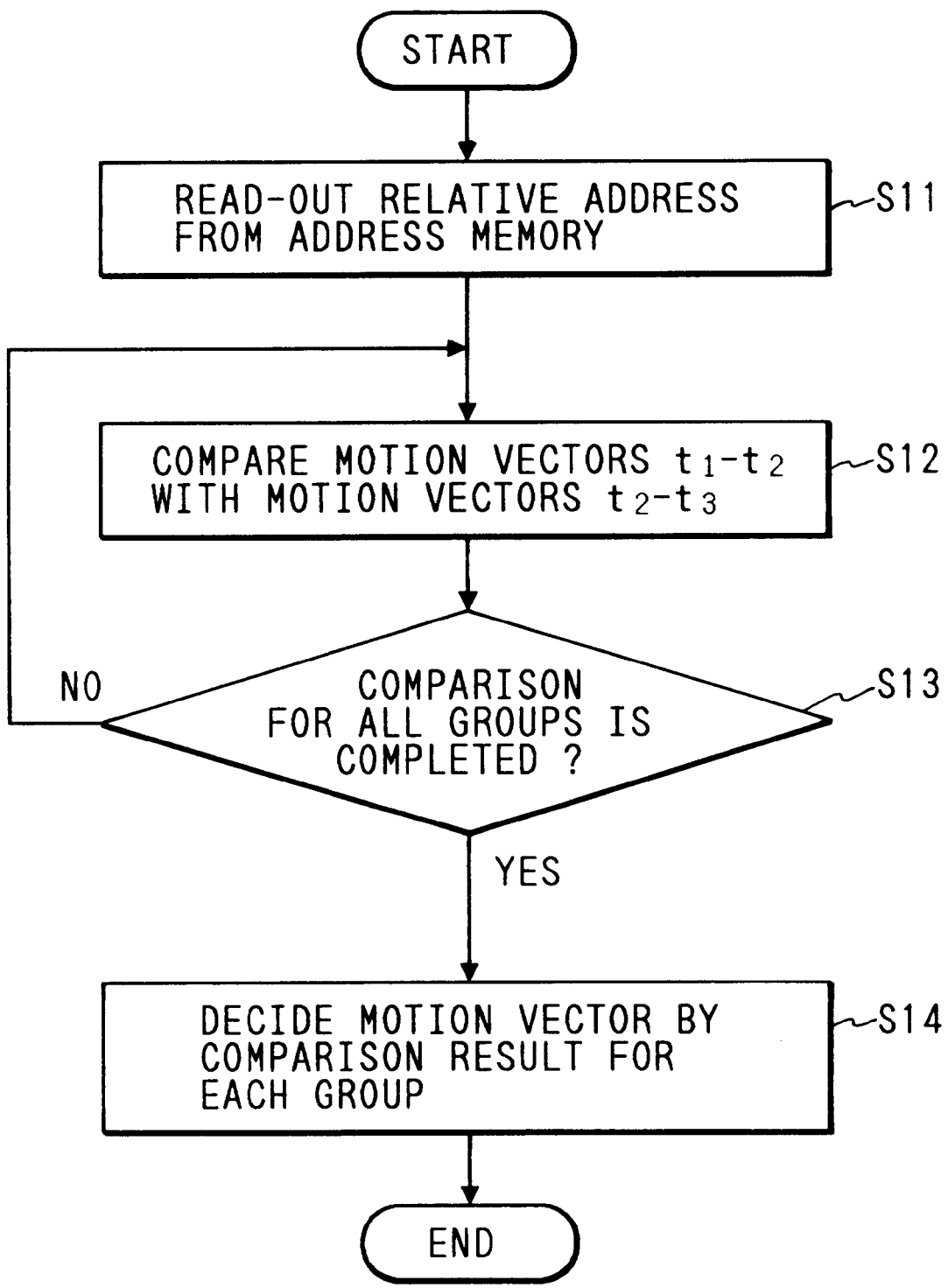
FIG. 19 shows a flow chart for illustrating an operation of the vector detection circuit of FIG. 17.

Which one of the motion vector of V1 and V2 is to be outputted as the motion vector of BLK1 depends on which time image data is used as the image data for use in the interpolation. Namely, when the interpolation circuit 112 interpolates from the image of the time t1, the motion vector V1 is selected, and when the interpolation circuit 112 interpolates from the image of the time t3, the motion vector V2 is selected. In the present embodiment, since the interpolation is effected by using the image data of the earlier image, the motion vector V1 is selected. When the motion vector to be selected is determined, the vector detection circuit 425 reads the relative address corresponding to the motion vector from the address memory 411 and outputs it to the interpolation circuit 112 from the output terminal 413. The operation of the vector detection circuit 425 is shown in a flow chart of FIG. 19.

In general, an animation image has a high correlation to the preceding and succeeding fields and it is highly possible that a portion moving in one field is also moving in the preceding and succeeding fields. Accordingly, in the present embodiment, the motion vector of each block is detected by using the images of the preceding and succeeding fields of the field including the error block so that the precision in detecting the motion vector is improved.

The operation of the interpolation circuit 112 is same as that of the previous embodiment.

In the present embodiment, since the interpolation is performed by using the motion vector, a high quality image may be reproduced. Further, since the image data of the plurality of fields of different timings are used to detect the motion vector, the motion vector of each block may be precisely detected and the precision in estimating the motion vector of the error block is improved. Accordingly, the interpolation may be effected with the image data of higher correlation.

In the above embodiments, when the motion vector of each block is detected, the difference between the image data after the decoding is calculated and the correlation between the field of each block is detected based on the result of the calculation to detect the motion vector. As a result, the amount of calculation to detect the correlation of the image data is large and a circuit scale to detect the motion vector is large accordingly. In an embodiment to be described below, the motion vector can be detected without increasing the circuit scale.

Figure 20:
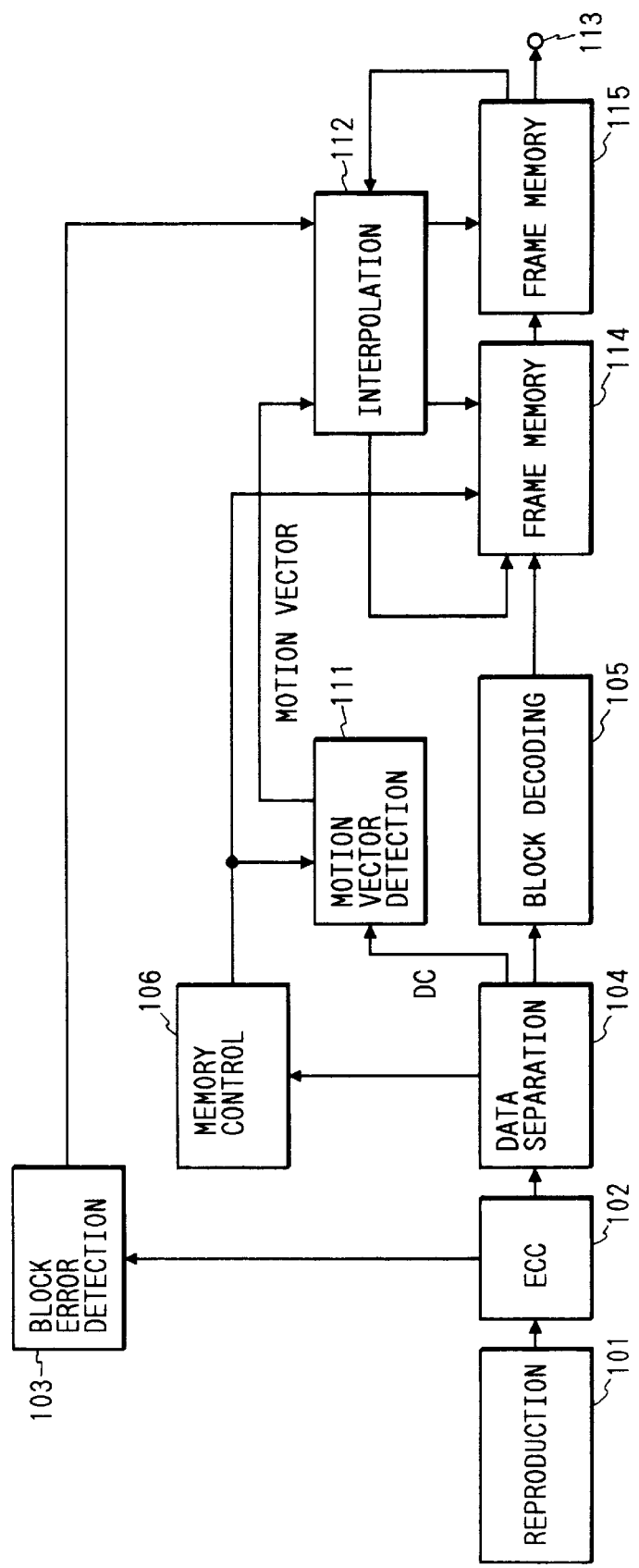
FIG. 20 shows a configuration of a digital VTR which uses another motion vector detection method.

FIG. 20 shows other configuration of the digital VTR reproducing apparatus of an embodiment of the present invention. In FIG. 20, the elements having the same functions as those of FIG. 4 are designated by the same numerals. In the present embodiment, in order to detect the motion vector between frames, the image data outputted from the block decode circuit 105 is outputted to the frame memory 114 frame by frame and stored therein. The image memory is also outputted from the frame memory 114 to the frame memory 115 frame by frame and the interpolation is effected frame by frame in the present embodiment.

Figure 21:
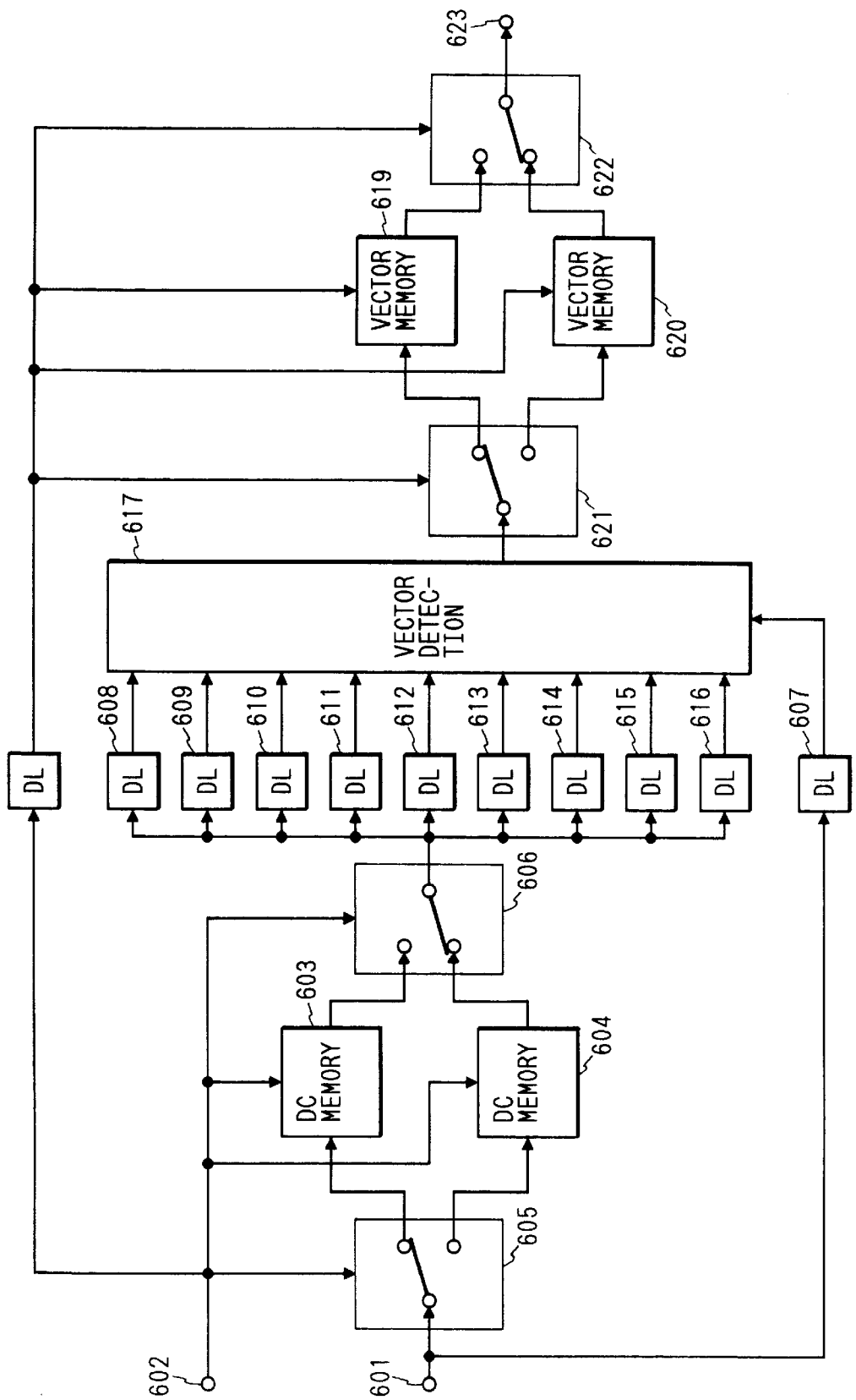
FIG. 21 shows a configuration of a motion vector detection circuit in the embodiment of the present invention.

In FIG. 20, the data separation circuit 104 separates the data outputted from the ECC circuit 102 to the block address data and the image data and outputs them to the block decoding circuit 105, the memory control circuit 106 and the motion vector detection circuit 111. The data separation circuit 104 outputs DC components of DCT coefficients of each pixel block to the motion vector detection circuit 111. The motion vector detection circuit 111 detects the motion vector for each block by using the DC data of each pixel block inputted from the data separation circuit 104. Referring to FIG. 21, the motion vector detection circuit 111 is explained.

FIG. 21 shows a block diagram of a configuration of the motion vector detection circuit 111. In FIG. 21, numeral 601 denotes an input terminal to which the DC data from the data separation circuit 104 is applied, and numeral 602 denotes an input terminal of the block address from the memory control circuit 106. The address corresponding to the DC data inputted to the input terminal 601 is inputted thereto. The DC data inputted from the input terminal 601 is stored in the DC memory 603 or 604 through the switch 605. Each of the DC memories 603 and 604 can store one frame of the DC data. That is, when one frame of image data is divided to m vertical block×n horizontal blocks, it may store m×n DC data.

The DC data stored in the DC memories 603 and 604 are outputted to the succeeding stage delay circuit through the switch 606. The switch 605 at the write end of the DC memory and the switch 606 at the read end are controlled by the address data from the input terminal 602 and switched in accordance with the frame of the input DC data. Namely, when the switch 605 is connected to the DC memory 603 and the DC data is written in the DC memory 603, the 606 is connected to the DC memory 604 so that the DC data in the DC memory 604 is controlled. In this manner, the DC memory at the write end stores the DC data of the same frame as that of the DC data inputted from the input terminal 602 and the DC memory at the read end stores the DC data of one frame earlier.

The DC memory at the read end reads the DC data of vertical 3 blocks×horizontal 3 blocks around the block whose motion vector is to be detected, and outputs them to the delay circuits 608–616.

Numeral 607 denotes a delay circuit and the delay times of the delay circuits 607–616 are set such that when the DC data of one block is inputted to the delay circuit 607, the delay circuits 607–616 output the DC data of the 3×3 blocks around the block located at the same position as the one block on the one frame earlier field.

The vector detection circuit 617 detects the motion vector by using the DC data. In the detection method, a difference absolute value between the DC data of the current frame and the DC data of the preceding frame is calculated and the motion vector of the block having the smallest difference is determined as the motion vector. In this case, vectors in eight direction, vertically and horizontally, around the block whose motion vector is to be detected may be detected.

Numeral 618 denotes a delay circuit and the delay time thereof is set such that the address of the block whose motion vector is to be detected is outputted by the vector detection circuit 617.

The motion vector detected by the vector detection circuit 617 is stored in the vector memories 619 and 620 through the switch 621. The vector memories 619 and 620 are for storing the motion vectors and each of them stores one frame of motion vector data. The motion vectors stored in the vector memories 619 and 620 are outputted from the output terminal 623 through the switch 622. The read and write of the vector memories 619 and 620 are effected in accordance with the address data from the delay circuit 618. The switching of the switches 621 and 622 is controlled by the address data such that the read and the write are alternately effected as they are in the DC memory described above.

The motion vector detected by the motion vector detection circuit 111 is outputted to the interpolation circuit 112. The following operation is same as that of the previous embodiment except that the process unit is by frame.

In accordance with the present invention, in detecting the motion vector when the interpolation is effected by using the motion vector, the move data is detected by using the DC data of the DCT coefficients of each block before decoding so that the amount of calculation to detect the motion vector is reduced. Accordingly, the circuit scale of the circuit to detect the motion vector is reduced.

In the present embodiment, since the motion vector is detected by using the DC data, the detection precision might be lower than that of the previous embodiments but the DC data represents the mean value of the pixel data of the block and it is sufficient when the motion vector is detected block by block.

In the present embodiment, 9 blocks comprising 3 vertical blocks×3 horizontal blocks around the block whose move data is to be detected are used as the search window to detect the motion vector, this is not restrictive and the number may be changed in accordance with the required precision.

In the previous embodiment, the interpolation is effected by using the image data of the preceding field of the field including the error block. Where the interpolation is effected by using only the images of the preceding field, the correlation with the image of the preceding field disappears if a scene changes between the images of the preceding field and the current field and the images totally change between the fields, and in such a case a high quality image is not attained by the interpolation.

In an embodiment to be described below, a digital VTR which allows to prevent the interpolation by the non-correlated image when the scene change occurs to produce a high quality reproduced image is explained.

Figure 22:
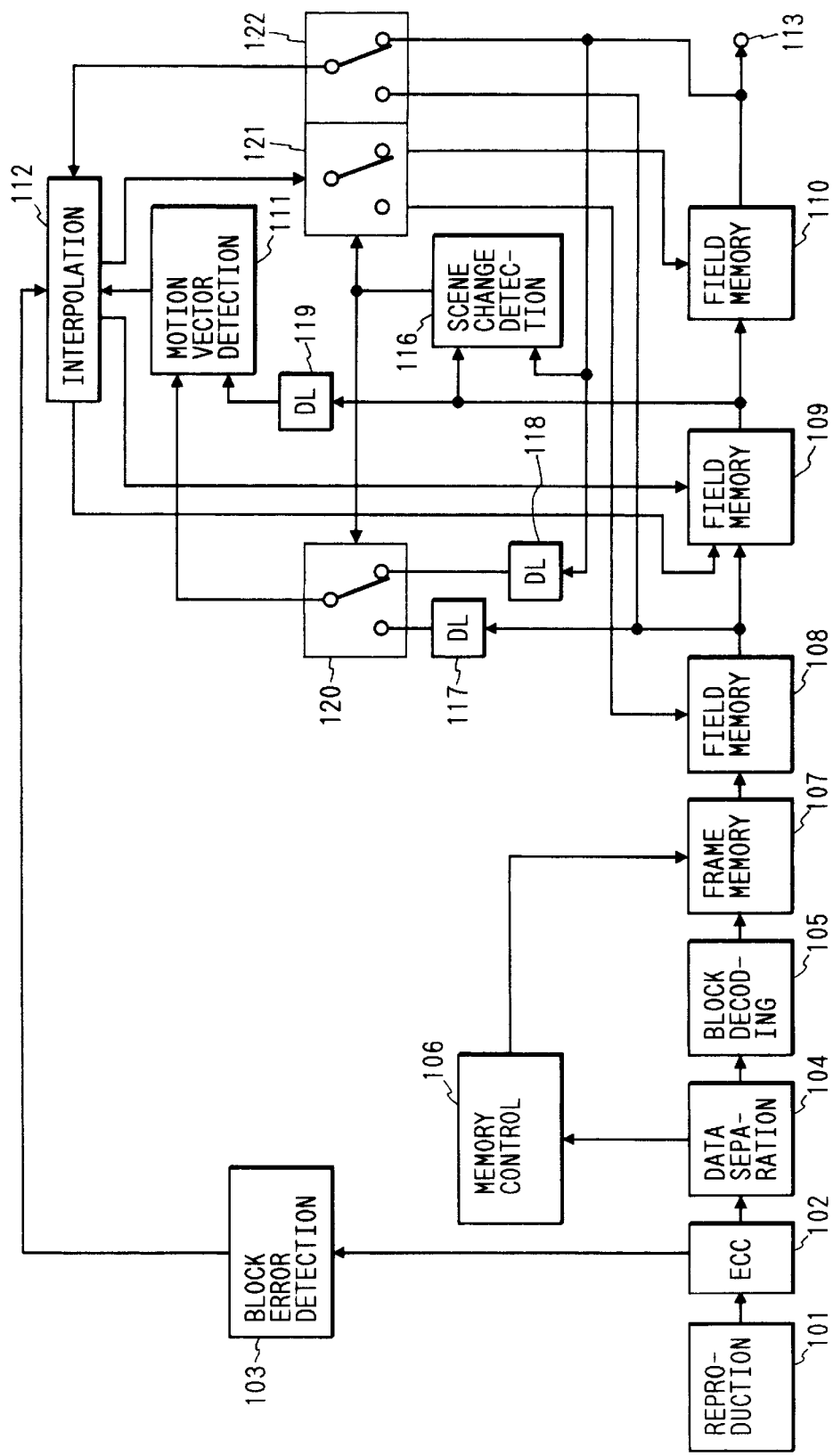
FIG. 22 shows a configuration of a digital VTR in an embodiment of the present invention.

FIG. 22 shows a block diagram of a configuration of the digital VTR reproducing apparatus in an embodiment of the present invention. In FIG. 22, the elements having the same functions as those of the previous embodiments are designated by the same numerals and the explanation thereof is omitted.

In FIG. 22, the image data reproduced from the magnetic tape by the reproducing circuit 101 is processed by the ECC circuit 102, the data separation circuit 104 and the block decoding circuit 105 in the manner described above and outputted to the frame memory 107. The frame memory 107 outputs the image data to the field memory 108 in the order of the first field and the second field of each frame. The field memory 109 stores the image data of the preceding field to the image data stored in the field memory 108, and the interpolation is effected to the image data stored in the field memory 109. The field memory 110 stores the image data of one field earlier than the image data stored in the field memory 109, that is, the image data of one filed earlier than the image data to be interpolated.

The scene change detection circuit 116 determines whether the scene change has occurred or not by using the image data of the field memories 109 and 110. Referring to FIG. 23, the operation of the scene change detection circuit 116 is explained.

FIG. 23 shows a block diagram of a configuration of the scene change detection circuit 116.

In FIG. 23, the image data read from the field memories 109 and 110 are inputted to input terminals 701 and 702, respectively. The input image data are inputted to a subtract circuit 703 which determines a difference for each pixel and outputs it to an addition integration circuit 704. The addition ingetration circuit 704 accumulates the absolute values of the differences of one field and outputs it to a compare circuit 706. A predetermined threshold stored in a ROM 705 is outputted to the compare circuit 706, which compares the difference outputted from the addition integration circuit 704 with the threshold, and if the absolute value of the difference is larger, it determines that the scene change has occurred and outputs a signal indicating thereof to the switches 120, 121 and 122 through an output terminal 707.

The delay times of the delay circuits 123, 124 and 125 are set to delay the image data outputted from the respective memories until the scene change detection circuit 116 outputs the decision. The switch 120 receives the output signal of the scene change detection circuit 116, and if the scene change has not occurred, it selects the image data of the preceding field (the image data in the field memory 110), and if the scene change has occurred, it selects the image data of the next field (the image data in the field memory 108).

The motion vector detection circuit 110 detects the inter-field motion vector, image block by image block, from the image data of the field to be interpolated and the image data of the fields selected by the selection switch 120 (the fields before and after the field to be interpolated) and outputs it to the interpolation circuit 111. In the present embodiment, the motion vector detection circuit shown in FIG. 9 is used. The motion vector detection may be implemented by the method described in the previous embodiment.

The interpolation circuit 112 estimates the movement of the error block by using the motion vectors of the surrounding blocks of the error block detected by the motion vector detection circuit 110, and thereafter determines the address to be read stored in the field memories 108 and 110 by using the estimated motion vector of the error block and outputs the address to the switch 121. The switches 121 and 122 operate in response to the output signal of the scene change detection circuit 116. If the scene change has not occurred, the field memory 110 is selected, and if the scene change has occurred, the field memory 108 is selected.

The selected field memory receives the address from the switch 121 and outputs the image data of the corresponding address to the switch 122. The selection switch 122 outputs the image data to the interpolation circuit 112 which outputs the address data of the block to be interpolated and the image data to be used for the interpolation to the field memory 109. The field memory 109 receives the address data and the image data to be used for the interpolation from the interpolation circuit 112 and writes the image data to that address to update the image data. In this manner, the interpolation is effected.

Referring to FIGS. 24A and 24B, the manner of the interpolation is explained. FIG. 24A shows the interpolation when the scene change has not occurred, and FIG. 24B shows the interpolation when the scene change has occurred between the preceding field and the current field.

As shown in FIG. 24A, when the scene change has not occurred, the motion vector of the image data of the current field to the image data of the preceding field is determined, and the motion vector of the error block is estimated by using the determined motion vector.

When the scene change has occurred, it is considered that there is substantially no correlation between the image of the preceding field and the image of the current field and it is not possible to interpolate by using the image data of the preceding field. Accordingly, the motion vector of the image data of the current field to the image data of the next field is determined and the motion vector of the error block is estimated from the determined motion vector. By using the motion vector of the error block, the image data of the error block is interpolated from the image data of the next field.

When the interpolation of the image stored in the field memory 109 is completed, the data of the field memory 110 is outputted to the external equipment from the output terminal 113. The data of the field memory 109 is written into the field memory 110 and the field memory 108 receives the next field data from the frame memory 107. The above operation is repeated, and where the error data is included in the image data stored in the field memory 109, the interpolation is effected in the same manner.

In the present embodiment, the scene change between the field including the error block and the preceding field is detected and the image data to be used for the motion vector detection and the interpolation is adaptively selected form the preceding and next fields so that a high quality image is always reproduced. This is particularly effective when the scene change occurs immediately before the field including the error block.

Figure 25:
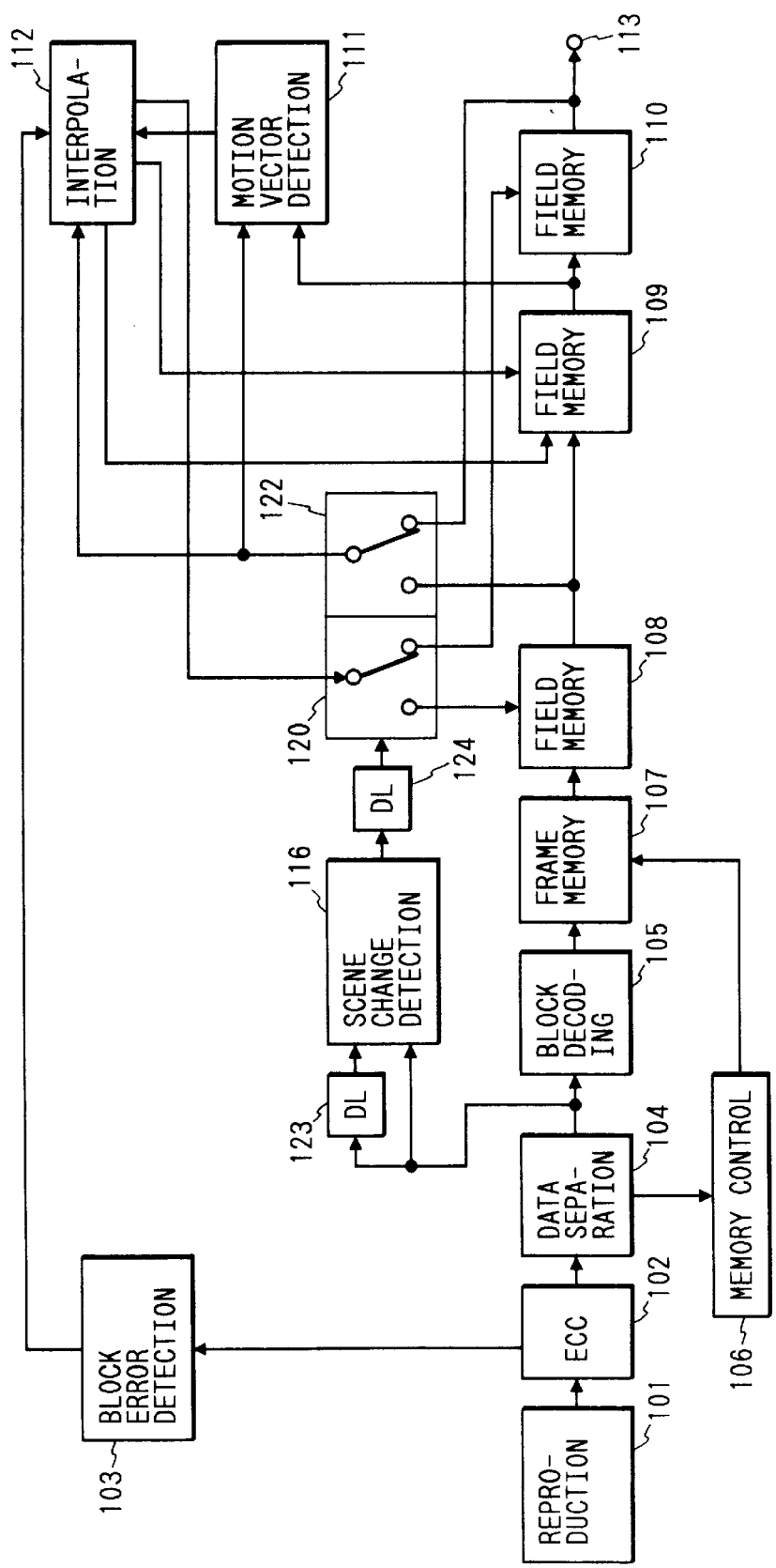
FIG. 25 shows a configuration of a digital VTR in an embodiment of the present invention.

Referring to FIG. 25, other embodiment which allows the detection of the scene change is explained.

In FIG. 25, the image data separated by the data separation circuit 104 is outputted to the block decoding circuit 105 and also outputted to the delay circuit 123 and the scene change detection circuit 132.

The image data before the conversion from the frequency area to the space area is inputted to the delay circuit 123 from the data separation circuit 104 and the delay time of the delay circuit 123 is set to output the image data of one frame earlier than the image data outputted by the data separation circuit 104. The scene change detection circuit 116 receives the image data, block by block, from the data separation circuit 104 and the delay circuit 123 and determines whether there has been a scene change between frames. The determination may be made by calculating an absolute value of a difference between coefficients of the DC components of the blocks between frames and determining whether a sum thereof exceeds a threshold or not. Namely, in the present embodiment, only the absolute value of the difference of the DC components need be calculated and the amount of calculation is less than that of the first embodiment and the circuit scale may be smaller. The circuit configuration is similar to that shown in FIG. 23 and the operation is similar except that the input data is the DC data.

The switches 120 and 122 operate in linked relation and receive the scene change detection signal from the delay circuit 134 having a delay time corresponding to the time of 3 fields+motion vector detection time, and if the scene change has not occurred, the image data of the preceding field (the image data stored in the field memory 110) is selected, and if the scene change has occurred, the image data of the succeeding field (the image data of the succeeding field) is selected.

The motion vector detection circuit 111 detects the interfield motion vector, block by block, from the image data to be interpolated and the image data of the field selected by the switch 122 (selected one of the preceding and succeeding fields of the field to be interpolate) and outputs it to the interpolation circuit 112, as the motion vector detection circuit 111 of the previous embodiment does. The interpolation circuit 112 estimates the motion vector of the error block from the motion vectors of the surrounding blocks of the error block, determines the address to be read of the field memories 108 and 110 based on the determined motion vector and outputs the address to the switch 120.

The switch 120 selects the field memory 110 when the scene change has not occurred, and selects the field memory 108 when the scene change has occurred. The selected field memory receives the address data from the selection switch 120 and outputs the image data of that address to the selection switch 122. The switch 122 outputs the image data to the interpolation circuit 112, which outputs the address data of the block to be interpolated and the interpolation image data to the field memory 109. The field memory 109 receives the address data and the interpolation image data from the interpolation circuit 112 and updates the image data of the error block to complete the interpolation.

In this manner, the scene change is detected based on the image data before the decoding and the image data to be used for the motion vector detection and the interpolation is adaptively selected so that a high quality image can always by reproduced.

Figure 26:
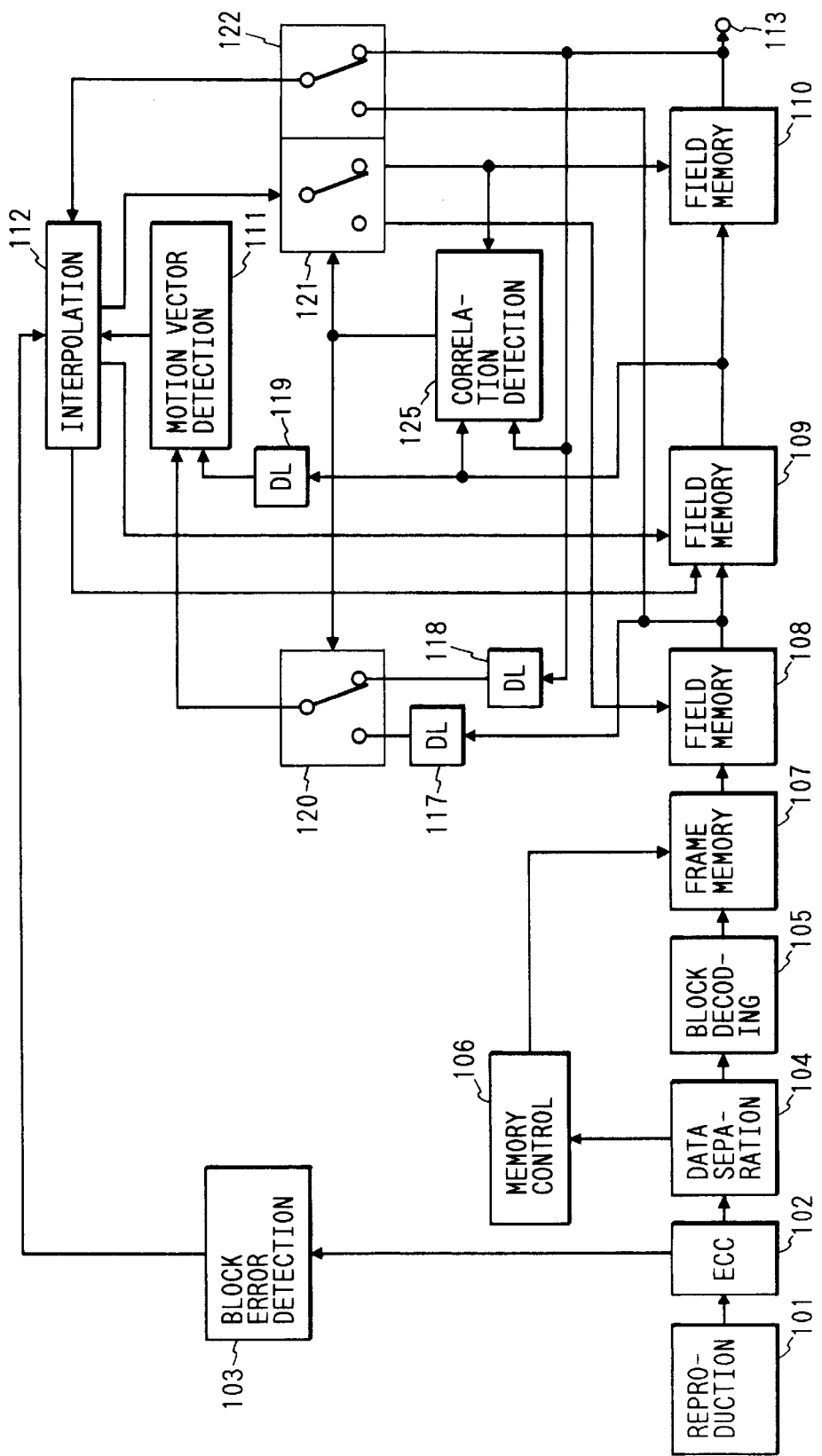
FIG. 26 shows a configuration of a digital VTR in an embodiment of the present invention.

In the above embodiment, the correlation between the image including the error block and the image of one field earlier is determined, and the presence or absence of the scene change is determined based on the correlation and the interpolation is effected. Alternatively, the correlations between the image of the field including the error block and the images of one field earlier and one field later may be detected, and one of the data of the images which has a higher correlation may be used for the motion vector detection and the error block interpolation so that the most correlated image data can always be used for the interpolation without being affected by the scene change. FIG. 26 shows a block diagram of a configuration of the digital VTR which allows the above function, as an embodiment of the present invention.

Figure 27:
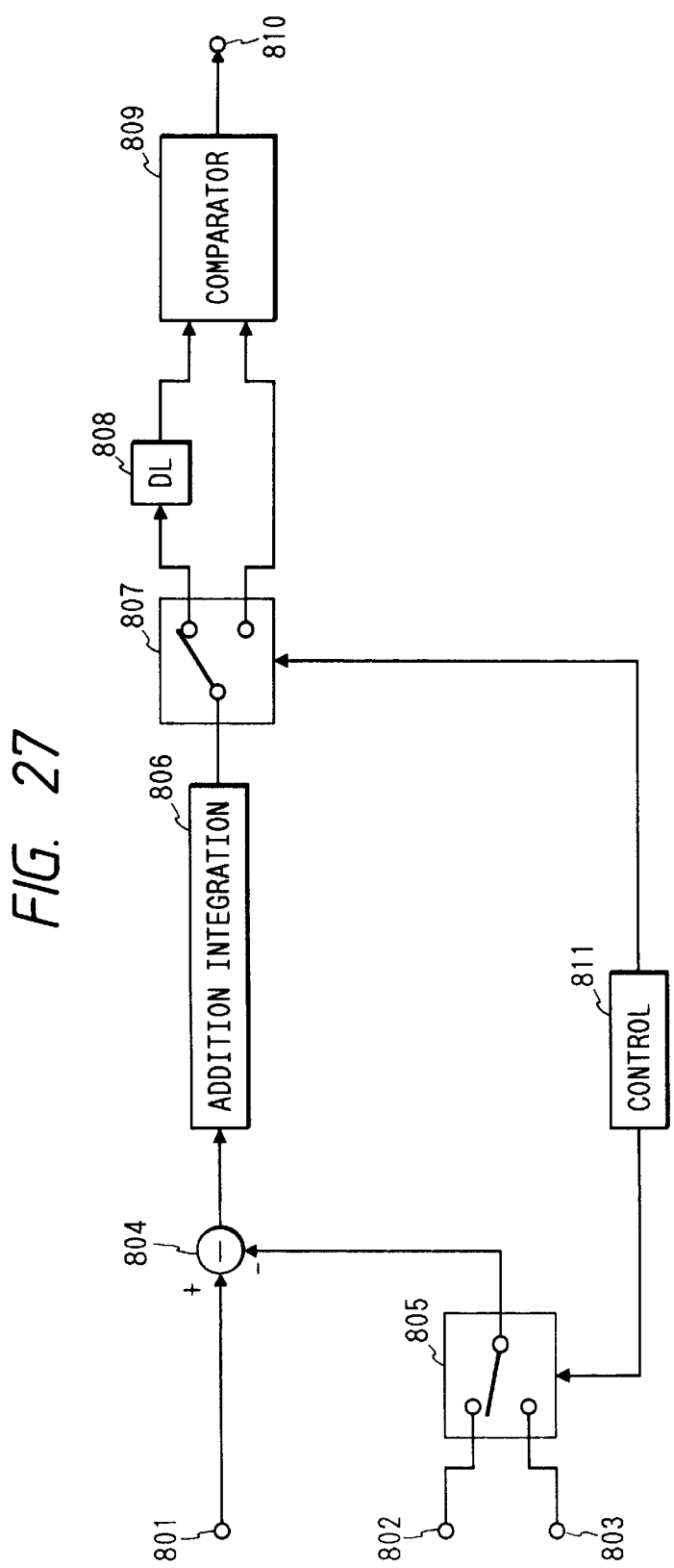
FIG. 27 shows a configuration of a correlation detection circuit in the apparatus of FIG. 26.

In FIG. 26, numeral 125 denotes a correlation detection circuit which detects the correlation between the image of the field including the error block and the image of the preceding and succeeding fields and determines which one has a higher correlation. Other configuration is similar to that of FIG. 22. Referring to FIG. 27, the correlation detection circuit 125 is explained.

FIG. 27 shows a block diagram of a configuration of the correlation detection circuit 125. The image data read from the field memories 109, 108 and 110 are inputted to input terminals 801, 802 and 803, respectively. The image data from the field memory 109 inputted to the input terminal 801 is outputted to a subtract circuit 804, and the image data from the field memories 108 and 110 inputted to the input terminals 802 and 803 are outputted to a switch 805.

The switch 805 is controlled by a control circuit 811, and when the correlation between the image of the field including the error block and the image of the succeeding field is to be detected, it is connected to the input terminal 802, and when the correlation with the preceding field is to be determined, it is connected to the input terminal 803. In the present embodiment, the image data are read in the order of the field memories 108 and 110. Accordingly, the image data of the field memory 109 is read twice. The readout of the image data from the field memories is effected by the control circuit 811.

The image data outputted from the switch 805 is outputted to the subtract circuit 804. The subtract circuit 804 subtracts the two input image data, pixel by pixel, and outputs the difference to an addition integration circuit 806, which accumulates the absolute values of the input difference for one field and outputs it to a switch 807. The switch 807 is also controlled by the control circuit 811 and it is connected to the delay circuit 808 when the image data from the field memory 108 is selected by the switch 805, and connected to the opposite when the image data from the field memory 110 is selected. The delay circuit 808 delays the absolute value of the difference outputted from the addition integration circuit 806 by the time corresponding to the accumulation time of the absolute values of the differences of one field and outputs it to a compare circuit 809. The absolute value of the difference outputted from the switch 807 is also outputted to the compare circuit 809.

Of the output from the addition integration circuit 806, the one inputted through the delay circuit 808 represents the absolute difference from the succeeding field and the one inputted without routing the delay circuit 808 represents the absolute difference from the preceding field. The absolute differences indicate the correlations between the image stored in the field memory 109 and the images of the preceding and succeeding fields, and the smaller the value is, the higher is the correlation. The compare circuit 809 compares the two absolute differences and produces a signal indicating the smaller one. Accordingly, the signal indicates the image of higher correlation.

The signal outputted from the correlation detection circuit 125 is outputted to the switches 120–122, and the switches are connected to the field memories which store the highly correlated images. The subsequent process is similar to that of the apparatus shown in FIG. 22.

In the present embodiment, of the correlations between the image of the field including the error block and the images of the preceding and succeeding fields, the image data of the higher correlation is used for the motion vector detection and the interpolation so that the interpolation is made by the image data of higher correlation and a high quality image is always reproduced.

In the present embodiment, the correlations between the field including the error block and the immediately preceding and succeeding fields are compared. Alternatively, the correlations of the field including the error block and several preceding and several succeeding fields may be detected, the correlations of the respective fields are compared and the image signal of the field having the highest correlation may be used for the interpolation.

In the above embodiment of the motion vectors of the surrounding blocks of the error block are detected, the motion vector of the error block is estimated from those motion vectors in this manner, the image of higher quality can be reproduced as compared to the prior art digital VTR.

The motion vector can b e detected with a considerably high precision by the method described in the previous embodiment, but when the detection precision of the motion vector is low and the motion vector is uncorrectly detected, discontinuity (unnatural image) may appear in the image at a boundary of the interpolated error block and the surrounding pixel blocks.

In an embodiment to be described below, an apparatus which can reproduce a high quality image without prominent discontinuity at the boundary of the interpolated error block and the surrounding pixel blocks even if the motion vector is uncorrectly detected is explained.

Figure 28:
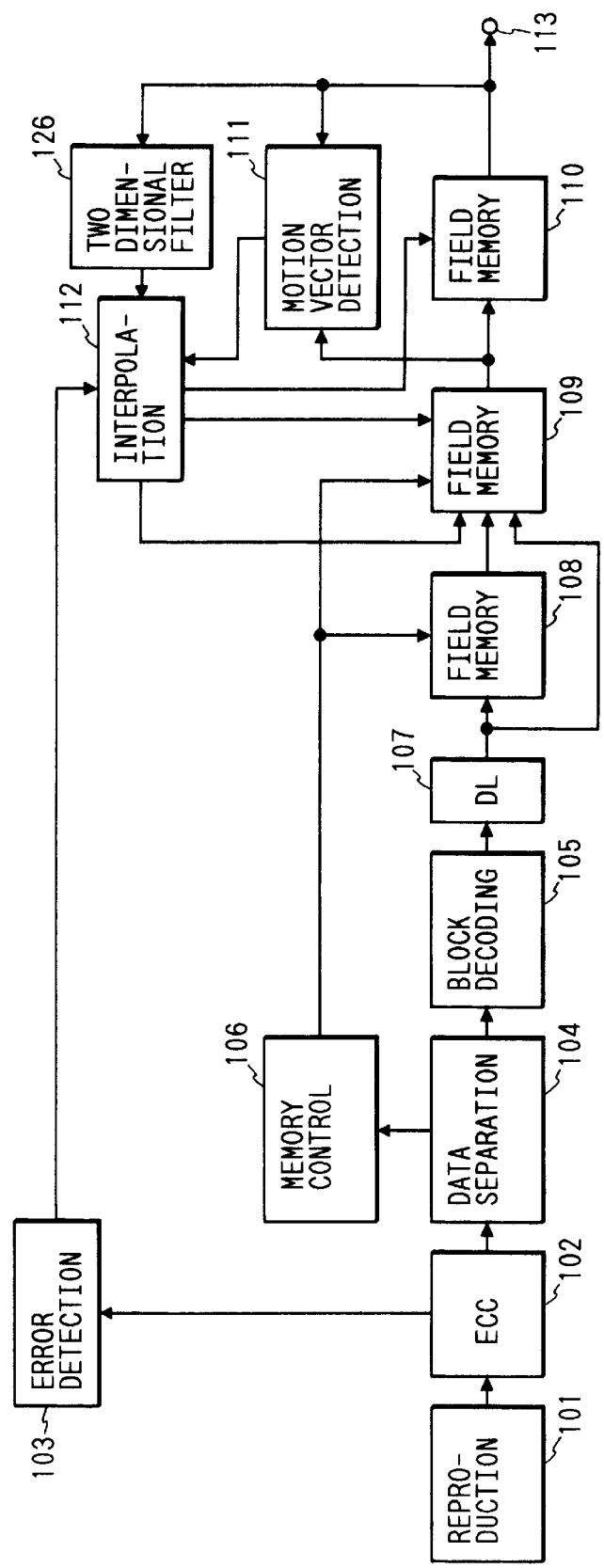
FIG. 28 shows a configuration of a digital VTR in an embodiment of the present invention.

FIG. 28 shows a block diagram of a configuration of the digital VTR reproducing apparatus as an embodiment of the present invention. In FIG. 28, the like elements to those of FIG. 4 are designated by the like numerals.

In FIG. 28, the motion vector is detected by the motion vector detection circuit 111, and the interpolation circuit 112 estimates the motion vector of the error block from the motion vectors of the surrounding blocks of the error block and effects the interpolation, as they do in the previous embodiment.

Numeral 126 denotes a two-dimension digital filter. In the present embodiment, a high frequency component of the image data stored in the field memory 110 is eliminated by a digital filter 126 for use in the interpolation. Namely, in the present embodiment, the high frequency component is bandlimited to desharpen the outline of the block used for the interpolation so that the discontinuity of the images of the interpolated block and the surrounding blocks due to the uncorrectness of the estimated motion vector is rendered visually less prominent.

Another configuration in an embodiment of the present invention which renders the boundary of the interpolated error block and the surrounding blocks less prominent is explained.

Figure 29:
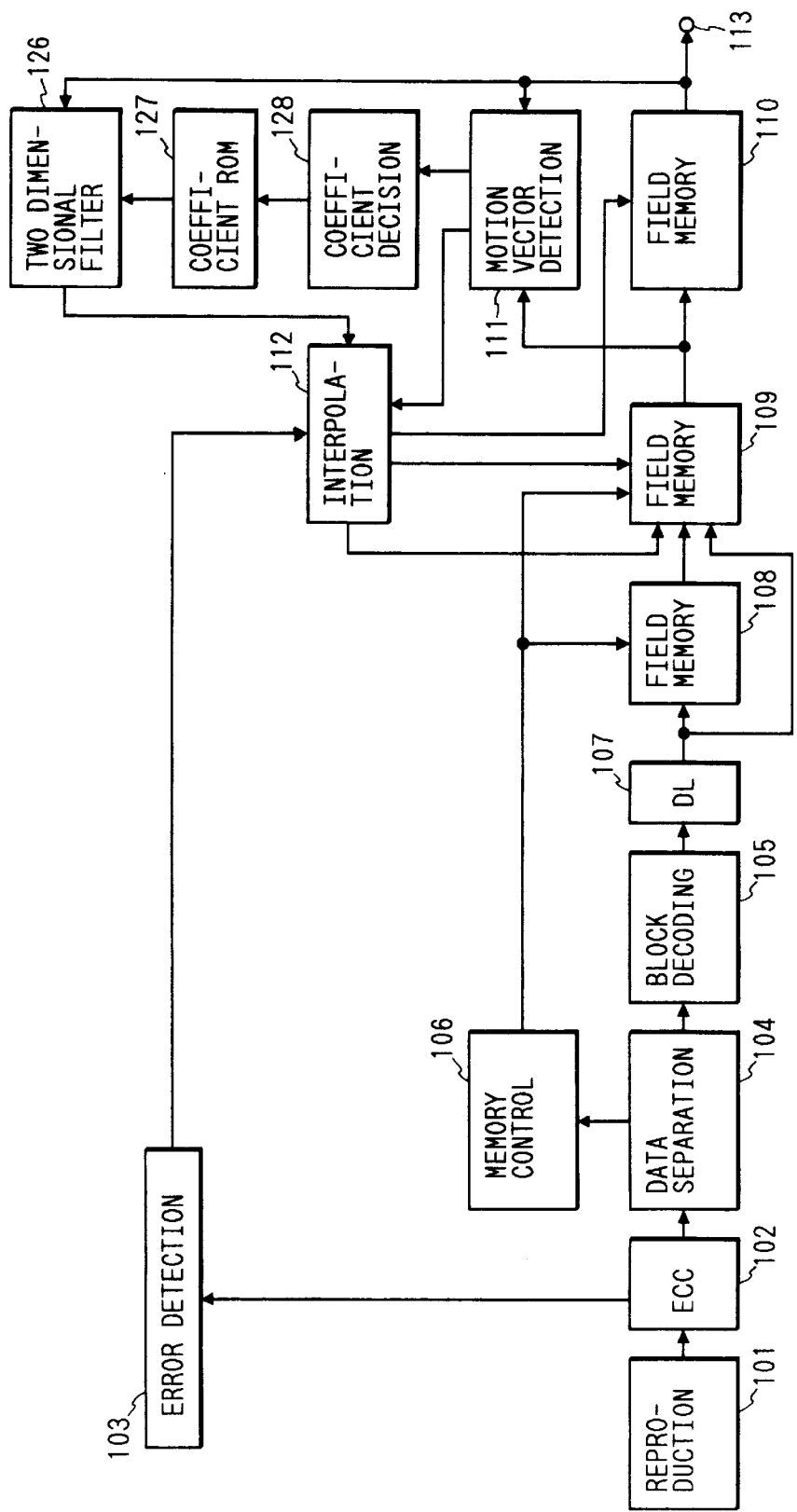
FIG. 29 shows a configuration of a digital VTR in an embodiment of the present invention.

FIG. 29 shows a block diagram of a configuration of the digital VTR reproducing apparatus. In the present embodiment, a cutoff frequency characteristic of the two-dimension filter 126 is changed in accordance with the magnitude of the motion vector of the error block.

In FIG. 29, numeral 127 denotes a ROM which stores filter coefficients which determine the cutoff frequency characteristic of the digital filter 126 and numeral 128 a coefficient discrimination circuit for determining the magnitude of the motion vector outputted from the motion vector detection circuit 111 to select the cutoff characteristic of the digital filter 126 (outputs the address of the coefficient ROM 127).

The interpolation in the present embodiment is explained. The motion vector detection circuit 111 detects the interfield motion vector, block by block, from the image data stored in the field memories 109 and 110. The motion vector is outputted to the interpolation circuit 112 and the coefficient discrimination circuit 128. The coefficient discrimination circuit 128 determined the magnitude of the motion vector outputted from the motion vector detection circuit 111 and outputs the read address to the coefficient ROM 127 to select the corresponding coefficient of the digital filter 126. The coefficient ROM 127 outputs the coefficient corresponding to the read address to the digital filter 126 and determines the cutoff frequency characteristic of the digital filter 126.

By controlling the space frequency characteristic of the interpolated block in accordance with the magnitude of the motion vector, the cutoff frequency of the digital filter 126 is set to pass most of the image signal (including the high frequency component) to maintain the resolution (outline) of the image when the magnitude of the motion vector is small, that is, when the movement of the error block is almost zero. When the magnitude of the motion vector is large, that is, when the movement of the error block has occurred, the cutoff frequency is shifted to a lower side in accordance with the magnitude of the motion vector to eliminate the high frequency component (desharpen the outline) of the block to be used for the interpolation so that the discontinuity of the images of the interpolated block and the surrounding blocks due to the incompleteness of the motion vector is rendered less prominent and visually high quality interpolation is attained.

In the previous embodiment, the high frequency component of the block to be used for the interpolation is eliminated to render the boundary of the interpolated block and the surrounding blocks less prominent. Alternatively, the high frequency components of the surrounding blocks of the error block may be eliminated. An embodiment which eliminates the high frequency components of the surrounding blocks of the error block in addition to the block used for the interpolation is explained below.

Figure 30:
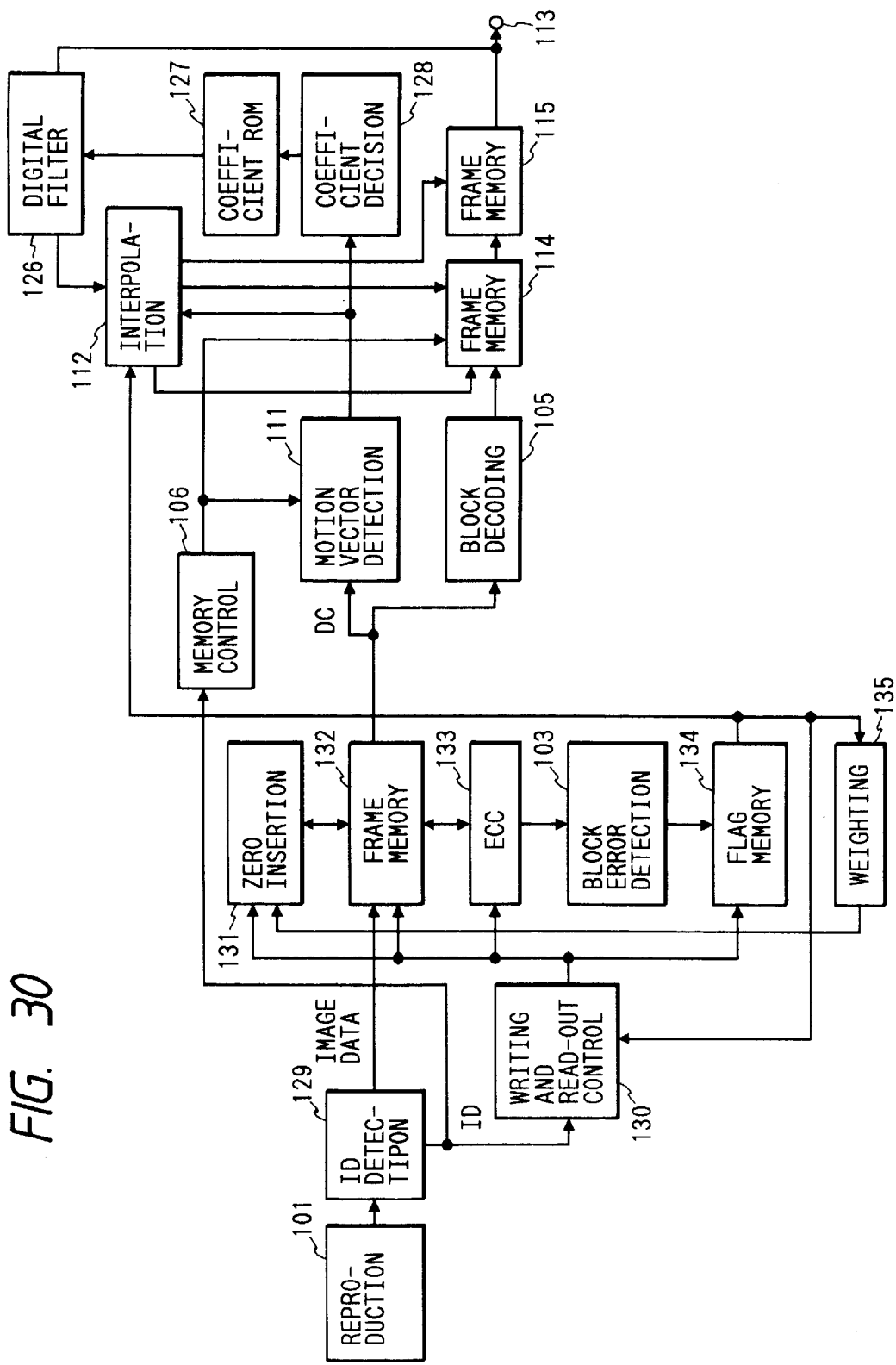
FIG. 30 shows a configuration of a digital VTR in an embodiment of the present invention.

FIG. 30 shows a block diagram of a configuration of the digital VTR reproducing apparatus as an embodiment of the present invention.

In FIG. 30, the image data reproduced by the reproducing circuit 101 is outputted to an ID detection circuit 129 which separates the input image signal to attribute data (hereinafter referred to as ID data) indicating the position on the field of each block included in the image signal and the image data, and outputs them for each block.

The ID data from the ID detection circuit 129 is inputted to a write/read control circuit 130 which writes the image data outputted from the ID detection circuit 129 to the frame memory 132 for each block having error corrected based on the content of the ID data. The write/read control circuit 130 further controls the write and read of a flag memory 134 and a zero-insertion circuit 131.

The input image data is the DCT-processed data and relates to the spatial frequency of the image data in the original image. The image data inputted to the frame memory 132 has the error correction applied by the ECC circuit 133 based on the error correction code added to the image data and the error-corrected image data is written again into the frame memory 132. The block error detection circuit 103 responds to the error correction result to output an error flag of a high level "1" signal for the data not error-corrected, and an error flag of a low level "0" signal for the data having no error or error-corrected, and it is inputted to the flag memory 134.

In the present embodiment, the error flag outputted to the flag memory 134 is inputted to the interpolation circuit 112, the write/read control circuit 113 and a weighing circuit 135. When the error flag from the flag memory 134 is "1", the write/read control circuit 130 reads the data of the surrounding blocks of the error block from the frame memory 132 in a predetermined order and controls the zero insertion circuit 131 to replace a portion of the data of the surrounding blocks with zero. The zero insertion circuit 131 is controlled by the weighing circuit 135 such that the closer the surrounding block to the error block on the field is, the lower frequency components are replaced by zero.

Figure 31:
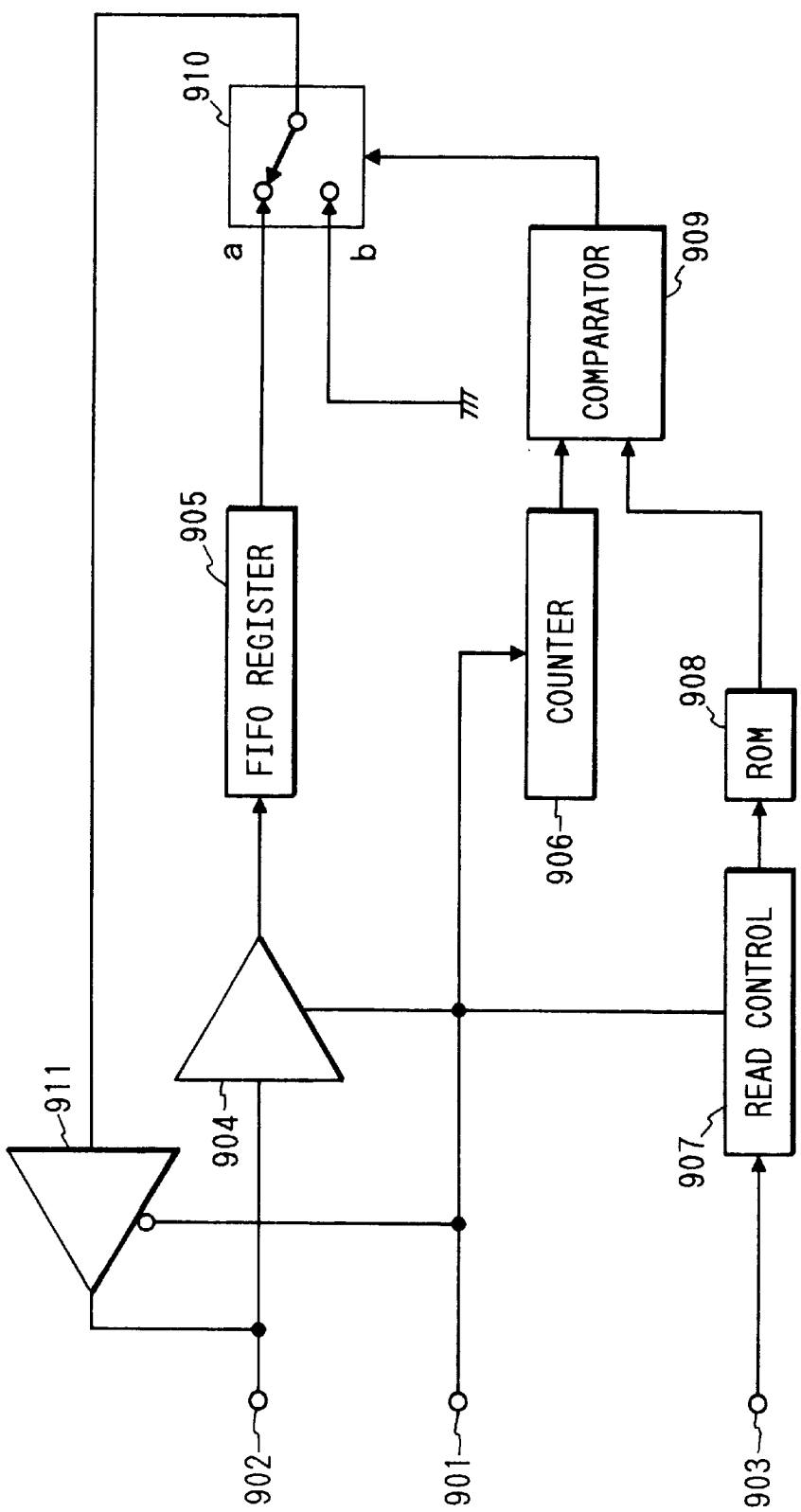
FIG. 31 shows a configuration of a zero-insertion circuit in the apparatus of FIG. 30.
Figure 32:
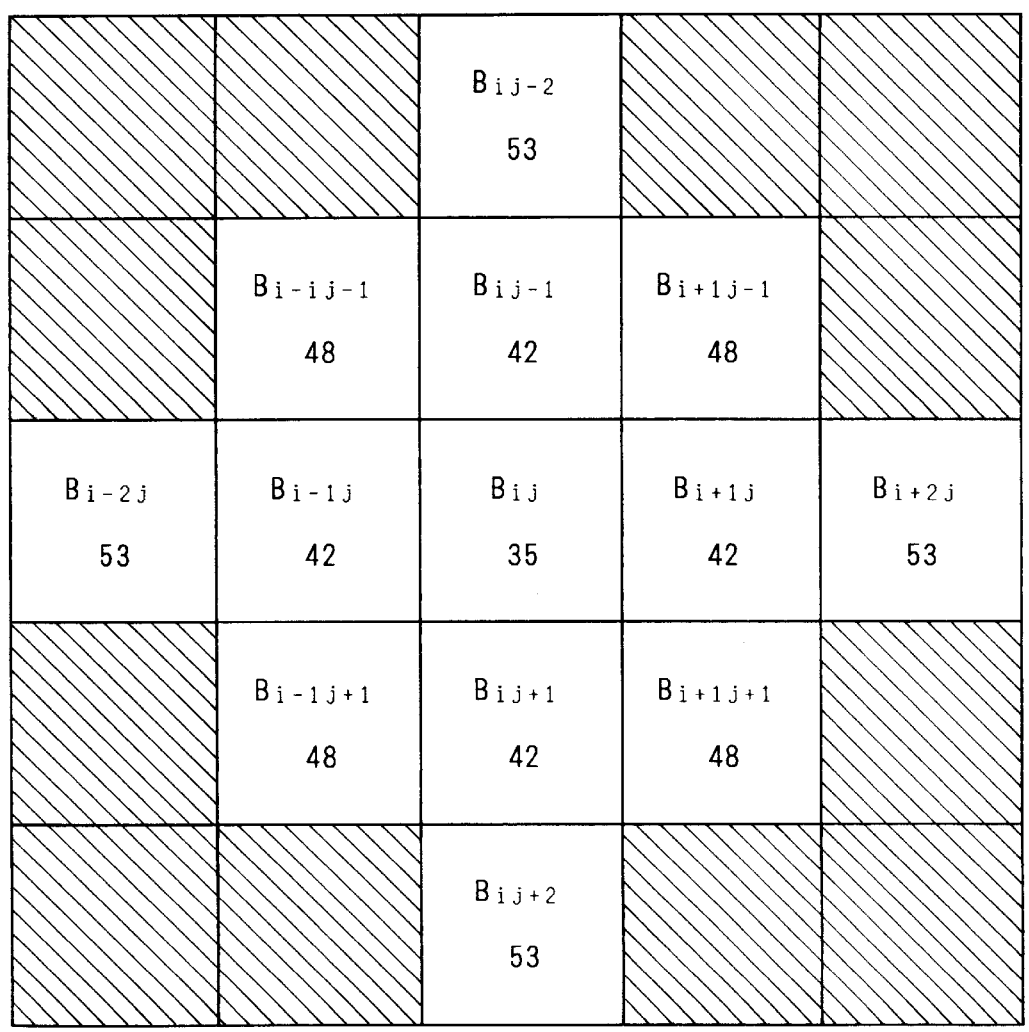
FIG. 32 illustrates an operation of the circuit of FIG. 31.

Referring to FIGS. 31 and 32, the operation of the zero insertion circuit 131 of the present embodiment is explained. FIG. 31 shows a block diagram of a configuration of the zero insertion circuit 131.

In FIG. 31, the control signal from the write/read control circuit 130 is inputted to a terminal 901 and the image data from the frame memory 132 is inputted to a terminal 902. The data at the terminal 902 is inputted and outputted 64 data (DCT coefficients) as a unit where a block comprises 8 pixels×8 pixels.

When the image data is inputted to the terminal 902 and the image data is received by a three-state buffer (hereinafter referred to as TSB) 904, the control signal inputted to the terminal 901 is high level "1". The TSB 904 outputs the image data inputted to the terminal 902 to a first-in first-out (hereinafter referred to as FIFO) register 905. On the other hand, the output of the TSB 911 is now of high impedance and the TSB 911 isolated from the terminal 902.

The FIFO register 905 can store one block of image data, and when one block of or 64 image data are read to the FIFO register, the write/read control circuit 130 outputs a low level "0" control signal to the terminal 901. The output of the TSB 904 is now of high impedance and the output of the TSB 904 is isolated from the input of the FIFO register 905. The output signal of the TSB 911 is outputted to the terminal 902.

When the control signal inputted to the terminal 901 is low level, "0", the counter 906 counts the number of image data outputted by the FIFO register 905. The FIFO register 905 outputs as many data as the number of pulses by clock pulses outputted by a control circuit, not shown. The counter 906 counts the pulses to count the number of data outputted by the FIFO register 905.

The output of the counter 906 is compared with the output data of the ROM 908 by the compare circuit 909. The write/read control circuit 130 responds to the start of the count of the image data of the blocks by the counter 906 to output the control signal to the input terminal 903. The read control circuit 907 reads a plurality of references from the ROM 908 in accordance with the control signal from the input terminal 903 and outputs a "1" signal when the output value of the counter 906 is larger than the output value of the ROM 908, and outputs a "0" signal when it is smaller. The data at the terminal 902 are inputted in the ascending order of the frequency in the block. Accordingly, the data outputted later, of the data outputted from the FIFO register 905 is the data having the relatively high frequency component.

Referring to FIG. 32, the above operation is explained. FIG. 32 shows blocks on the field and $B_{i,j}$, $B_{i+1,j}$, ... shown in the top column of each block represent block numbers, and numbers 35, 42, ... in the bottom column represent the reference values stored in the ROM 908 shown in FIG. 31. The peripheral hatched blocks are pixel blocks to which the zero insertion is not effected.

In FIG. 32, the operation when the block $B_{i,j}$ is an error block is explained. When the "1" flag is inputted to the write/read control circuit 130 from the flag memory, the write/read control circuit 130 outputs a control signal to the zero insertion circuit 131 so that the data of the surrounding blocks of the block $B_{i,j}$ are read in from the frame memory 132. Namely, the data of the pixel blocks are read into the zero insertion circuit 131 in the order of $B_{i,j-1}$, $B_{i-1,j}$, $B_{i+1,j}$, $B_{i,j+1}$, $B_{i-1,j-1}$, $B_{i+1,j-1}$, $B_{i-1,j+1}$, $B_{i+1,j+1}$, $B_{i,j-2}$, $B_{i-2,j}$, $B_{i+2,j}$ and $B_{i,j+2}$. The read control circuit 907 of the zero insertion circuit 131 controls the readout of the ROM 908 in accordance with the control signal outputted from the write/read control circuit 130 such that the reference 42 is outputted when the data of the blocks $B_{i,j-1}$, $B_{i-1,j}$, $B_{i+1,j}$ and $B_{i,j+1}$ are read, the reference 48 when the data of the blocks $B_{i-1,j-1}$, $B_{i+1,j-1}$, $B_{i-1,j+1}$ and $B_{i+1,j+1}$ are read, and the reference 53 when the data of the blocks $B_{i,j-2}$, $B_{i-2,j}$, $B_{i+2,j}$ and $B_{i,j+2}$.

The switch 910 is connected to the terminal a when the output of the compare circuit 909 is "0", and connected to the terminal b when the output is "1" so that the components of the image data smaller than the reference outputted from the ROM 908, of the output image data of the FIFO register 205 with zero.

The data processed by the zero insertion circuit 131 is outputted to the motion vector detection circuit 111 and the block decoding circuit 105. The motion vector detection circuit may be the one shown in FIG. 21. The data of the surrounding blocks of the error block may have zero high frequency component but it does not pose a problem because only the DC data is used in detecting the motion vector. The motion vectors of the blocks detected by the motion vector detection circuit 111 are outputted to the interpolation circuit 112 and the coefficient discrimination circuit 128.

The subsequent operation is similar to that of the previous embodiment and the image data used for the interpolation read from the frame memory 115 has the high frequency component thereof eliminated by the digital filter in accordance with the magnitude of the motion vector.

In the present embodiment, since the data of the error block and the surrounding blocks of the error block do not include the high frequency component, the image is displayed in a soft tone and the discontinuity of the images of the error block and the surrounding blocks is reduced and the deterioration of the image quality is visually less prominent.

In the present embodiment, the encoding of the image signal and the detection of the motion vector are effected for the block comprising 8 pixels×8 pixels, although a block comprising other number of pixels may be used.

What is claimed is:

1. An image signal processing apparatus for processing an image signal comprised of plural blocks, comprising:

reproducing means for reproducing, from a recording medium, an encoded image signal which includes the image signal and an error correction check code;

error correction means for detecting correctable and uncorrectable errors in the encoded image signal reproduced by said reproducing means, and for correcting correctable errors, by error correction processing the reproduced encoded image signal, where each of the correctable and uncorrectable errors is a code error that arose after the image signal was encoded;

motion vector detection means for detecting a motion vector of an error block which includes an uncorrectable error, by using the image signal reproduced by said reproducing means; and image signal forming means for forming a replacement image signal for the image signal of the error block, the replacement image signal being formed based on the motion vector for the error block detected by said motion vector detection means.

2. An image signal processing apparatus according to claim 1, wherein said motion vector detection means includes:

detection means for detecting estimated motion vectors for a block that does not include an uncorrectable error;

generation means for generating the motion vector of the block that does not include an uncorrectable error in accordance with frequencies of occurrence of the estimated motion vectors detected by said detection means; and forming means for forming the motion vector of the error block in accordance with motion vectors of blocks surrounding the error block generated by said generation means.

3. An image signal processing apparatus according to claim 1, wherein said motion vector detection means includes:

detection means for detecting a plurality of estimated motion vectors corresponding to different timings for a block that does not include an uncorrectable error;

generation means for generating a motion vector of the block that does not include an uncorrectable error based on the estimated motion vectors detected by said detection means; and forming means for forming the motion vector of the error block in accordance with motion vectors of blocks surrounding the error block generated by said generation means.

4. An image signal processing apparatus according to claim 3, wherein said image signal comprises plural fields, and wherein said detection means detects the estimated motion vectors corresponding to the different timings by using a portion of the image signal corresponding to a field preceding a field which includes the uncorrectable error and a portion of the image signal corresponding to a field succeeding the field which includes the uncorrectable error.

5. An image signal processing apparatus according to claim 4, wherein said generation means includes selection means for comparing the directions of the estimated motion vectors detected by said detection means and for selectively outputting an estimated motion vector in accordance with the comparison result.

6. An image signal processing apparatus according to claim 5, wherein the replacement image signal is formed for the image signal of the error block by using the portions of the image signal corresponding to the fields preceding and succeeding the field including the error block.

7. An image signal processing apparatus according to claim 6, wherein said selection means selects the estimated motion vector to output by using the portion of the image signal corresponding to the field preceding the field including the error block when said image signal forming means is to form the image signal of the error block by using the portion of the image signal corresponding to the field preceding the field including the error block, and selects the estimated motion vector to output by using the portion of the image signal corresponding to the field succeeding the field including the error block when said image signal forming means is to form the image signal by using the portion of the image signal corresponding to the field succeeding the field including the error block.

8. An image reproducing apparatus according to claim 1, wherein the image signal reproduced by said reproducing means is block encoded by using orthogonal transformation, and wherein said motion vector detection means detects the motion vector for the error block by using orthogonal transformation coefficients of the image signal reproduced by said reproducing means.

9. An image signal processing device for processing an image signal comprised of plural blocks, comprising:

reproducing means for reproducing, from a recording medium, an encoded image signal which includes the image signal and at least one other signal;

detection means for detecting a portion of the image signal having a code of low reliability as a detected portion, by using the other signal, the low reliability of the code arising after the image signal was encoded;

motion vector detection means for detecting motion vectors for blocks of the image signal not containing the detected portion by using the image signal reproduced by said reproducing means; and motion vector generation means for generating a motion vector of a block which contains the detected portion, wherein the motion vector is generated based on motion vectors detected by said motion vector detection means for blocks surrounding the block which contains the detected portion.

10. An image signal processing device according to claim 9, further comprising:

forming means for forming a replacement image signal for a second portion of the image signal corresponding to the block which contains the detected portion in accordance with the motion vector generated by said motion vector generation means.

11. An image signal processing device according to claim 9 wherein said image signal is a block-encoded image signal.

12. A device according to claim 11, wherein the other signal includes an error correction check code, wherein said detection means includes error correction means for correcting a correctable error in the reproduced image signal by using the error correction check code, and wherein the detected portion is uncorrectable by said error correction means.

13. An image signal processing device according to claim 12, wherein said motion vector generation means includes synthesis means for synthesizing the motion vectors detected by said motion vector detection means, and wherein said motion vector generation means generates the motion vector of the block which contains the detected portion by using a sum of the motion vectors of the blocks which do not contain a portion of the image signal which is uncorrectable by said error correcting means, and which surround the block which contains the detected portion.

14. An image signal processing device according to claim 12, wherein said motion vector generation means includes synthesis means for synthesizing the motion vectors detected by said motion vector detection means in accordance with the magnitudes of the motion vectors detected by said motion vector detection means, and wherein said motion vector generation means generates the motion vector of the block which contains the detected portion by using a sum of motion vectors of blocks which do not contain a portion of the image signal which is uncorrectable by said error correction means, and which surround the block containing the detected portion.

15. An image signal processing apparatus for processing image signals respectively corresponding to plural pictures, comprising:

reproducing means for reproducing, from a recording medium, an encoded image signal which includes an image signal and an error correction check code;

error correction means for detecting correctable and uncorrectable errors in the encoded image signal reproduced by said reproducing means, and for correcting correctable errors, by error correction processing the reproduced encoded image signal, where each of the correctable and uncorrectable errors is a code error that arose after the image signal was encoded;

correlation detection means for detecting a correlation between an error-containing image signal, the error-containing image signal including an uncorrectable error and corresponding to an error-containing picture, and an image signal which corresponds to an other picture, wherein the error-containing picture is different from the other picture;

image signal forming means for forming a replacement image signal for a portion of the error-containing image signal which includes the uncorrectable error, said image signal forming means forming the replacement image signal (1) based on a first image signal corresponding to a picture preceding the error-containing picture when the correlation between the error-containing image signal and a second image signal corresponding to a picture succeeding the picture is smaller than a predetermined threshold, and (2) based on the second image signal when the correlation between the error-containing image signal and the first image signal is smaller than a predetermined level.

16. An image signal processing apparatus for processing an image signal comprised of plural blocks, comprising:

reproducing means for reproducing, from a recording medium, an encoded image signal which includes an image signal and an error correction check code;

error correction means for detecting correctable and uncorrectable errors in the encoded image signal reproduced by said reproducing means, and for correcting correctable errors, by error correction processing the reproduced encoded image signal, where each of the correctable and uncorrectable errors is a code error that arose after the image signal was encoded;

motion vector detection means for detecting a motion vector of blocks of the image signal not containing an uncorrectable error;

generation means for generating a motion vector of a block containing an uncorrectable error, based on motion vectors detected by said motion vector detection means of blocks surrounding the block including the uncorrectable error by using the image signal reproduced by said reproducing means;

image signal forming means for forming a replacement image signal for a portion of the image signal which includes the block including the uncorrectable error, based on the motion vector generated by said generation means; and modifying means for modifying a portion of the blocks surrounding the block including the uncorrectable error.

17. An image signal processing apparatus according to claim 16, wherein said modifying means modifies at least one of the blocks surrounding the block containing the uncorrectable error in accordance with a distance between the block containing the uncorrectable error and the one of the blocks surrounding the block containing the uncorrectable error.

18. An image signal processing apparatus according to claim 17, wherein said modifying means changes the degree of modification in accordance with the distance between the block containing the uncorrectable error and the one of the blocks surrounding the block containing the uncorrectable error.

19. An image signal processing apparatus according to claim 16, wherein said image signal is encoded by orthogonal transformation, and said modifying means modifies orthogonal transformation coefficients of the one of the blocks surrounding the block containing the uncorrectable error to a predetermined value.

20. An image signal processing apparatus according to claim 19, wherein the blocks surrounding the block containing the uncorrectable error are within a field which includes the uncorrectable error, and wherein said modifying means modifies the orthogonal transformation coefficients of high frequency components of the blocks surrounding the block containing the uncorrectable error to a predetermined value.

21. An image signal processing apparatus according to claim 20, wherein said modifying means modifies more high frequency components to a predetermined value for surrounding blocks that are closer to the block containing the uncorrectable error than for surrounding blocks that are further from the block containing the uncorrectable error.

22. An image signal processing apparatus according to claim 16 further comprising:

elimination means for eliminating a high frequency component of the block which includes the image signal formed for the block containing the uncorrectable error.

23. An image signal processing apparatus according to claim 22, wherein said elimination means eliminates the high frequency component of the block containing the uncorrectable error in accordance with the motion vector of the block containing the uncorrectable error.

24. An image signal processing apparatus according to claim 23 wherein said elimination means changes a degree of elimination in accordance with a magnitude of the motion vector of the block containing the uncorrectable error.

25. An image signal processing apparatus according to claim 24, wherein said elimination means eliminates more high frequency components as the magnitude of the motion vector of the block containing the uncorrectable error becomes larger.

26. An image data processing device for processing image data comprised of plural frames, each having plural blocks, comprising:

reproducing means for reproducing an encoded image signal which includes image data and an error correction check code;

error correction means for detecting correctable and uncorrectable errors in the encoded image signal, and for correcting correctable errors by error correction processing the encoded image signal input by said input means, where each of the correctable and uncorrectable errors is a code error that arose after the image signal was encoded;

detection means for detecting a block having a correlation with an error block, the error block including an uncorrectable error, wherein the block detected by said detection means is in a frame other than a frame which includes the error block, and wherein a spatial position of the detected block relative to a spatial position of the error block is detected based on the image data; and concealing means for concealing the error block by using data from the block detected by said detecting means.

27. An image data processing device according to claim 26 wherein said image signal is block encoded.

28. An image data processing device for processing image data comprised of plural frames, each having plural blocks, comprising:

input means for inputting an encoded image signal which includes the image data and an error correction check code;

error correction means for detecting correctable and uncorrectable errors in the encoded image signal, and for correcting correctable errors by error correction processing the encoded image signal input by said input means, where each of the correctable and uncorrectable errors is a code error that arose after the image signal was encoded;

detection means for detecting a block having a correlation with an error block, the error block including an uncorrectable error, wherein the detected block is in a succeeding frame to the frame which includes the error block, and wherein a spatial position of the detected block relative to a spatial position of the error block is detected based on the image data; and concealing means for concealing the error block by using data from the block detected by said detection means.

29. An image signal processing apparatus for processing image data comprised of successive frames, each divided into a plurality of blocks, comprising:

reproducing means for reproducing, from a recording medium, an encoded image signal which includes the image data and an error correction check code;

error detection means for detecting correctable and uncorrectable errors in the encoded image signal reproduced by said reproducing means by error correction processing the reproduced encoded image signal, where each of the correctable and uncorrectable errors is a code error that arose after the image signal was encoded;

motion vector detection means for detecting motion vectors of said blocks by using the image data reproduced by said reproducing means; and forming means for forming replacement image data for an error block, the error block including an uncorrectable error, based on detected motion vectors, wherein said motion vector detection means detects a plurality of motion vectors based on image data of a frame which precedes a frame which includes the error block and also based on image data of a frame which succeeds the frame which includes the error block, and wherein said motion vector detection means detects a motion vector of the error block based on the plurality of motion vectors.

30. An apparatus according to claim 29, wherein said motion vector detection means detects the motion vector of the error block by using image data of both the frame which precedes the frame which includes the error block and the frame which succeeds the frame which includes the error block.

31. An apparatus according to claim 29, wherein said motion vector detection means detects the motion vector of the error block by selectively using the image data of the frame which precedes the frame including the error block and image data of the frame which succeeds the frame including the error block.

32. An apparatus according to claim 29, wherein the input image data includes block-encoded image data.

* * * * *

UNITED STATES PATENT AND TRADEMARK OFFICE
CERTIFICATE OF CORRECTION

PATENT NO. : 6,327,391 B1
DATED : December 4, 2001
INVENTOR(S) : Ohnishi, Shinji et al.

It is certified that error appears in the above-identified patent and that said Letters Patent is hereby corrected as shown below:

<u>Title page,</u>
Item [57], ABSTRACT,
Line 2, "including an" should read -- including any --.

Figure 1:
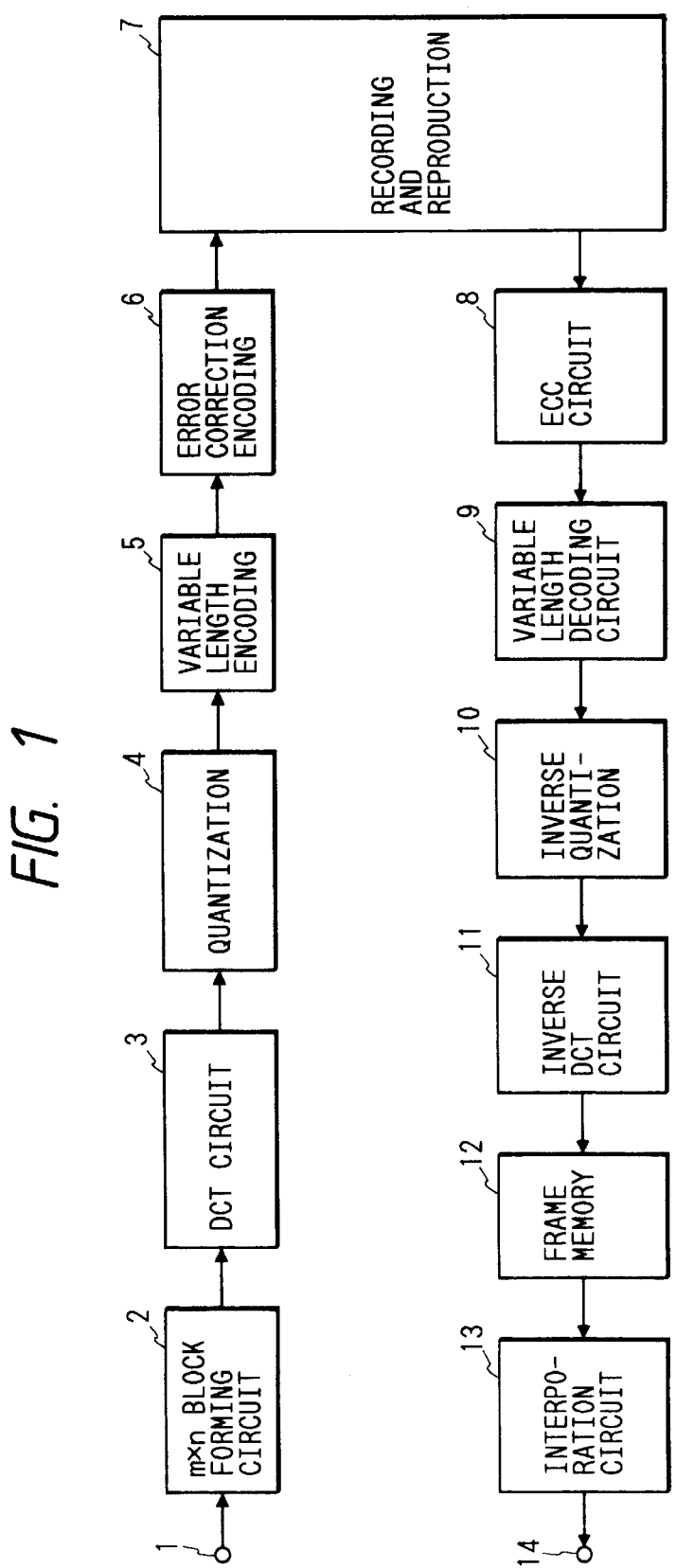
FIG. 1 shows a configuration of a digital VTR recording and reproducing apparatus.
Figure 3A:
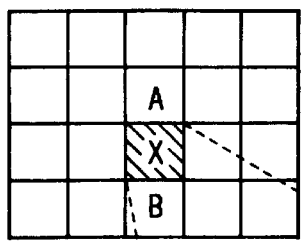
FIG. 3 illustrates intra-field interpolation.
Figure 3B:
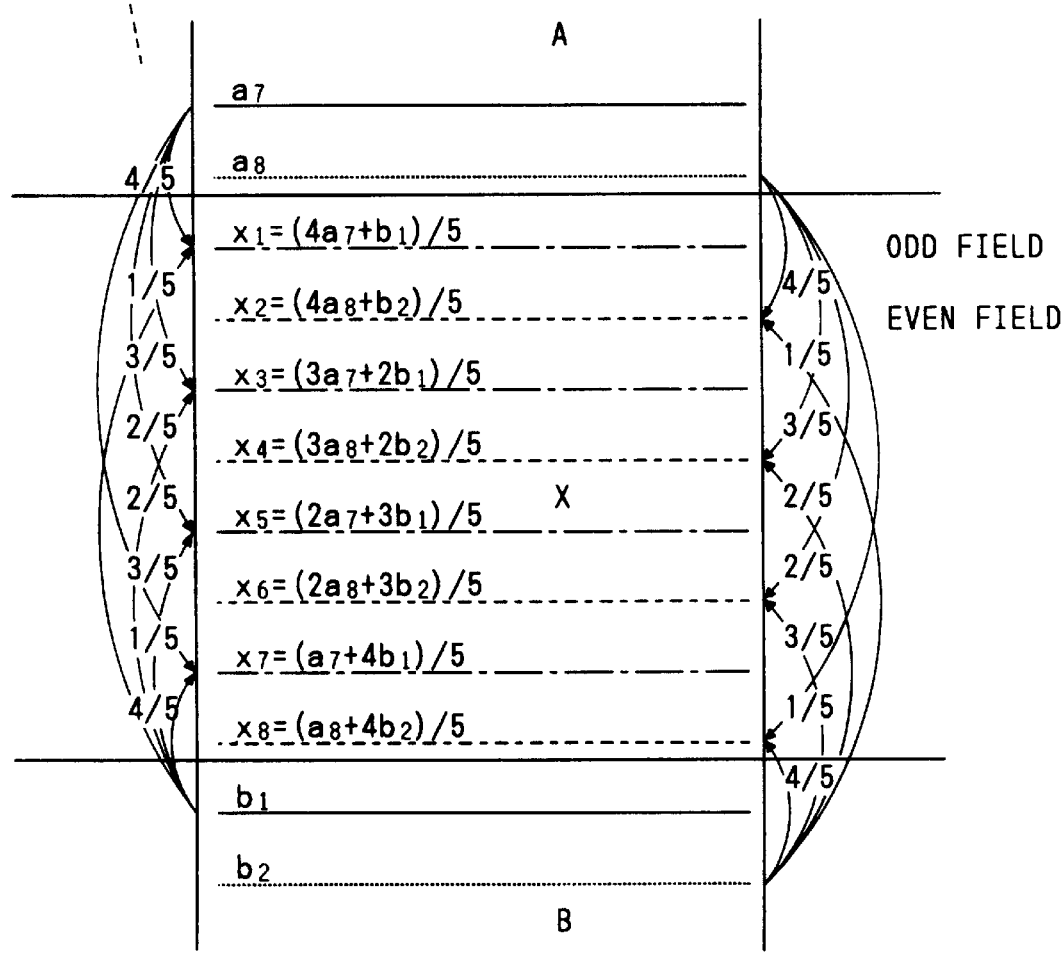

<u>Drawings,</u>
Sheet 1, Figure 1, "INTERPORATION" should read -- INTERPOLATION --.
Sheet 29, Figure 30, "DETECTIPON" should read -- DETECTION --.

<u>Column 1,</u>
Line 20, "such as" should read -- such methods as --;
Line 28, "groups" should read -- grouped --;
Line 50, "then" should read -- is then --;
Line 56, "is" should be deleted; and
Line 56, "or" should read -- undesired error or --.

<u>Column 3,</u>
Line 6, "field-intra" should read -- field•intra --.

<u>Column 4,</u>
Line 45, "other" should read -- another --; and
Line 46, "other" should read -- another --.

<u>Column 5,</u>
Line 8, "30," should read -- 30; --;
Line 30, "block•is" should read -- block is --;
Line 52, "is detected" should be deleted; and
Line 53, "form" should read -- from --.

<u>Column 6,</u>
Line 32, "Delay" should read -- The delay --.

<u>Column 7,</u>
Line 55, "245'" should read -- 245 --.

<u>Column 8,</u>
Line 17, "vector" ($1^{st}$ occurrence) should read -- vectors --.

UNITED STATES PATENT AND TRADEMARK OFFICE
CERTIFICATE OF CORRECTION

PATENT NO. : 6,327,391 B1
DATED : December 4, 2001
INVENTOR(S) : Ohnishi, Shinji et al.

It is certified that error appears in the above-identified patent and that said Letters Patent is hereby corrected as shown below:

Column 10,
Line 22, "example" should read -- examples --; and
Line 23, "is" should read -- are --.

Column 11,
Line 10, "configuration" should read -- configurations --;
Line 10, "is" should read -- are --;
Line 16, "other" should read -- another --;
Line 18, "to" should read -- as --;
Line 45, "unit, not" should read -- unit (not --; and
Line 45, "shown" should read -- shown) --.

Column 13,
Line 36, "other" should read -- another --.

Column 14,
Line 4, "blockx" should read -- blocksx --; and
Line 36, "direction," should read -- directions, --.

Column 15,
Line 8, "vector," should read -- vector; --; and
Line 55, "ingestration" should read -- integration --.

Column 17,
Line 4, "form" should read -- from --;
Line 9, "other" should read -- another --; and
Line 47, "interpolate)" should read -- (interpolated) --.

Column 18,
Line 5, "by" should read -- be --.

Column 19,
Line 30, "of" should be deleted;
Line 33, "manner," should read -- manner, and --;
Line 35, "b e" should read -- be --;
Line 38, "uncorrectly" should read -- incorrectly --;
Line 46, "uncorrectly" should read -- incorrectly --; and
Line 66, "uncorrectness" should read -- incorrectness --.

UNITED STATES PATENT AND TRADEMARK OFFICE
CERTIFICATE OF CORRECTION

PATENT NO. : 6,327,391 B1
DATED : December 4, 2001
INVENTOR(S) : Ohnishi, Shinji et al.

It is certified that error appears in the above-identified patent and that said Letters Patent is hereby corrected as shown below:

Column 20,
Line 11, "126" should read -- 126, --; and
Line 23, "determined" should read -- determines --.

Column 21,
Line 47, "isolated" should read -- is isolated --;
Line 49, "or 64" should -- (or 64) -- (not bold); and
Line 59, "circuit, not shown." should read -- circuit (not shown). --.

Column 22,
Line 32, "$B_{i,\,j+2}$." should read -- $B_{i,\,j+2}$ are read. --; and
Line 42, "Fig: 21." should read -- FIG. 21. --.

Signed and Sealed this

Sixth Day of August, 2002

Attest:

JAMES E. ROGAN
Attesting Officer          Director of the United States Patent and Trademark Office